US010104107B2

(12) United States Patent
Sridhara et al.

(10) Patent No.: US 10,104,107 B2
(45) Date of Patent: Oct. 16, 2018

(54) METHODS AND SYSTEMS FOR BEHAVIOR-SPECIFIC ACTUATION FOR REAL-TIME WHITELISTING

(71) Applicant: QUALCOMM Incorporated, San Diego, CA (US)

(72) Inventors: Vinay Sridhara, Santa Clara, CA (US); Yin Chen, Campbell, CA (US); Rajarshi Gupta, Sunnyvale, CA (US)

(73) Assignee: QUALCOMM Incorporated, San Diego, CA (US)

(\*) Notice: Subject to any disclaimer, the term of this patent is extended or adjusted under 35 U.S.C. 154(b) by 98 days.

(21) Appl. No.: 14/849,849

(22) Filed: Sep. 10, 2015

(65) Prior Publication Data

US 2016/0337390 A1 Nov. 17, 2016

Related U.S. Application Data

(60) Provisional application No. 62/159,433, filed on May 11, 2015.

(51) Int. Cl.
*H04L 29/06* (2006.01)
*G06F 21/56* (2013.01)
(Continued)

(52) U.S. Cl.
CPC ........ *H04L 63/1425* (2013.01); *G06F 3/0484* (2013.01); *G06F 21/566* (2013.01);
(Continued)

(58) Field of Classification Search
CPC . H04L 63/1425; H04L 63/101; G06N 99/005; G06F 3/0484; G06F 21/566; G06F 2221/033
See application file for complete search history.

(56) References Cited

U.S. PATENT DOCUMENTS 8,161,552 B1  4/2012 Sun et al.
8,656,465 B1\* 2/2014 Fong-Jones ......... G06F 21/6281
                                                        713/165
(Continued)

FOREIGN PATENT DOCUMENTS

CN   103607381 A   2/2014
CN   104484599 A   4/2015

OTHER PUBLICATIONS

International Search Report and Written Opinion—PCT/US2016/027462—ISA/EPO—Jul. 4, 2016.
(Continued)

*Primary Examiner* — Joseph P Hirl
*Assistant Examiner* — J. Brant Murphy
(74) *Attorney, Agent, or Firm* — James T. Hagler; The Marbury Law Group

(57) ABSTRACT

Various embodiments include methods of evaluating device behaviors in a computing device and enabling white listing of particular behaviors. Various embodiments may include monitoring activities of a software application operating on the computing device, and generating a behavior vector information structure that characterizes a first monitored activity of the software application. The behavior vector information structure may be applied to a machine learning classifier model to generate analysis results. The analysis results may be used to classify the first monitored activity of the software application as one of benign, suspicious, and non-benign. A prompt may be displayed to the user that requests that the user select whether to whitelist the software application in response to classifying the first monitored activity of the software application as suspicious or non-benign. The first monitored activity may be added to a whitelist of device behaviors in response to receiving a user input.

30 Claims, 12 Drawing Sheets

(51) Int. Cl.
*G06F 3/0484* (2013.01)
*G06N 99/00* (2010.01)

(52) U.S. Cl.
CPC ......... *G06N 99/005* (2013.01); *H04L 63/101* (2013.01); *G06F 2221/033* (2013.01)

(56) References Cited

U.S. PATENT DOCUMENTS

| | | | |
|---|---|---|---|
| 8,719,924 B1 | 5/2014 | Williamson et al. | |
| 9,047,466 B2 | 6/2015 | Zhou et al. | |
| 9,306,962 B1* | 4/2016 | Pinto | H04L 63/1416 |
| 2008/0046970 A1* | 2/2008 | Oliver | G06F 21/554 |
| | | | 726/3 |
| 2009/0187963 A1* | 7/2009 | Bori | G06F 21/51 |
| | | | 726/1 |
| 2011/0041179 A1* | 2/2011 | St Hlberg | G06F 21/566 |
| | | | 726/23 |
| 2011/0078487 A1* | 3/2011 | Nielsen | G06Q 30/02 |
| | | | 714/2 |
| 2013/0247187 A1* | 9/2013 | Hsiao | G06F 21/552 |
| | | | 726/22 |
| 2013/0304676 A1* | 11/2013 | Gupta | G06N 99/005 |
| | | | 706/12 |
| 2013/0305359 A1* | 11/2013 | Gathala | G06F 21/56 |
| | | | 726/22 |
| 2013/0333039 A1* | 12/2013 | Kelly | G06F 21/51 |
| | | | 726/24 |
| 2014/0051432 A1* | 2/2014 | Gupta | G06F 21/57 |
| | | | 455/425 |
| 2014/0053261 A1* | 2/2014 | Gupta | G06F 21/55 |
| | | | 726/22 |
| 2014/0241638 A1* | 8/2014 | Majumder | G06K 9/00979 |
| | | | 382/224 |
| 2015/0113644 A1* | 4/2015 | Klein | G06F 9/545 |
| | | | 726/23 |
| 2016/0314298 A1* | 10/2016 | Martini | G06F 21/53 |

OTHER PUBLICATIONS

Read J., et al., "Classifier Chains for Multi-label Classification," Machine Learning, Kluwer Academic Publishers-Plenum Publishers, NE, Jun. 30, 2011 (Jun. 30, 2011),vol. 85, No. 3, pp. 333-359, XP019967350, ISSN: 1573-0565, DOI: 10.1007/S10994-011-5256-5.

* cited by examiner

METHODS AND SYSTEMS FOR BEHAVIOR-SPECIFIC ACTUATION FOR REAL-TIME WHITELISTING

RELATED APPLICATIONS

This application claims the benefit of priority to U.S. Provisional Patent Application No. 62/159,433 entitled "Methods and Systems for Behavior-Specific Actuation for Real-Time Whitelisting" filed May 11, 2015, the entire contents of which are hereby incorporated by reference.

BACKGROUND

Cellular and wireless communication technologies have seen explosive growth over the past several years. This growth has been fueled by better communications and hardware, larger networks, and more reliable protocols. As a result, wireless service providers are now able to offer their customers with unprecedented levels of access to information, resources, and communications. To keep pace with these enhancements, consumer electronic devices (e.g., cellular phones, watches, headphones, remote controls, etc.) have become more powerful and complex than ever, and now commonly include powerful processors, large memories, and other resources that allow for executing complex and powerful software applications on their devices. These devices also enable their users to download and execute a variety of software applications from application download services (e.g., Apple® App Store, Windows® Store, Google® play, etc.) or the Internet.

Due to these and other improvements, an increasing number of mobile and wireless device users now use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, mobile devices are quickly becoming the next frontier for malware and cyber-attacks. Accordingly, new and improved security solutions that better identify and respond to malware and other non-benign device behaviors in resource-constrained computing devices, such as mobile and wireless devices, will be beneficial to consumers.

SUMMARY

Various embodiments include methods of evaluating device behaviors in a computing device and enabling white listing of particular behaviors. Various embodiments may include monitoring activities of a software application operating on the computing device, and generating a behavior vector information structure that characterizes a first monitored activity of the software application. The behavior vector information structure may be applied to a machine learning classifier model to generate analysis results. The analysis results may be used to classify the first monitored activity of the software application as one of benign, suspicious, and non-benign. The classification may be displayed along with a prompt that requests that the user select whether to whitelist the software application in response to classifying the first monitored activity of the software application as suspicious or non-benign. A user input may be received in response to displaying the prompt, and the first monitored activity may be added to a whitelist in response to receiving the user input. In some embodiments, adding the first monitored activity to the whitelist in response to receiving the user input may include storing the first monitored activity in a whitelist database in association with the software application.

In some embodiments, the method may further include classifying the first monitored activity into one or more sub-categories using multi-label classification or meta-classification techniques. In some implementations, the method may further include ceasing monitoring activity added to the whitelist.

In some embodiments, the method may further include continuing monitoring activities of the software application, and generating a second behavior vector information structure based, at least in part, on the monitored activities. The second behavior vector information structure may be applied to a second machine learning classifier model to generate additional analysis results. The additional analysis results may be used to classify a second monitored activity as one of benign, suspicious and non-benign, determine whether the second monitored activity is sub classified into the same sub-category as the first monitored activity. An additional prompt may be displayed that requests the user to select whether to whitelist the software application in response to determining that the second monitored activity is not sub classified into the same sub-category as the first monitored activity. In some embodiments, the method may further include receiving an additional user input in response to displaying the additional prompt. In some embodiments, in response to receiving the additional user input, the method may include removing the first monitored activity from the whitelist and terminating the software application and/or adding the second monitored activity to the whitelist.

Some embodiments may further include determining a relative importance of the first monitored activity, the relative importance characterized by the behavior vector information structure. In some embodiments, the information that identifies the relative importance of the first monitored activity may be included in the prompt that requests the user to select whether to whitelist the software application. Some embodiments may further include balancing between processing, memory, and/or energy resources used to monitor and analyze activities of the software application and the determined relative importance of the first monitored activity. In some embodiments, the balancing may include selecting actuation operations based, at least in part, on the determined relative importance of the first monitored activity. In some embodiments, selecting the actuation operations may include determining whether to perform robust or lightweight analysis operations based, at least in part, on behavior's sub-classifications.

Further embodiments include a computing device having a memory, a display, and a processor configured with processor-executable instructions for performing operations of the methods described above. Further embodiments include a non-transitory processor-readable medium on which is stored processor-executable instructions configured to cause a computing device to perform operations of the methods described above. Further embodiments include a computing device having means for performing functions of the methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
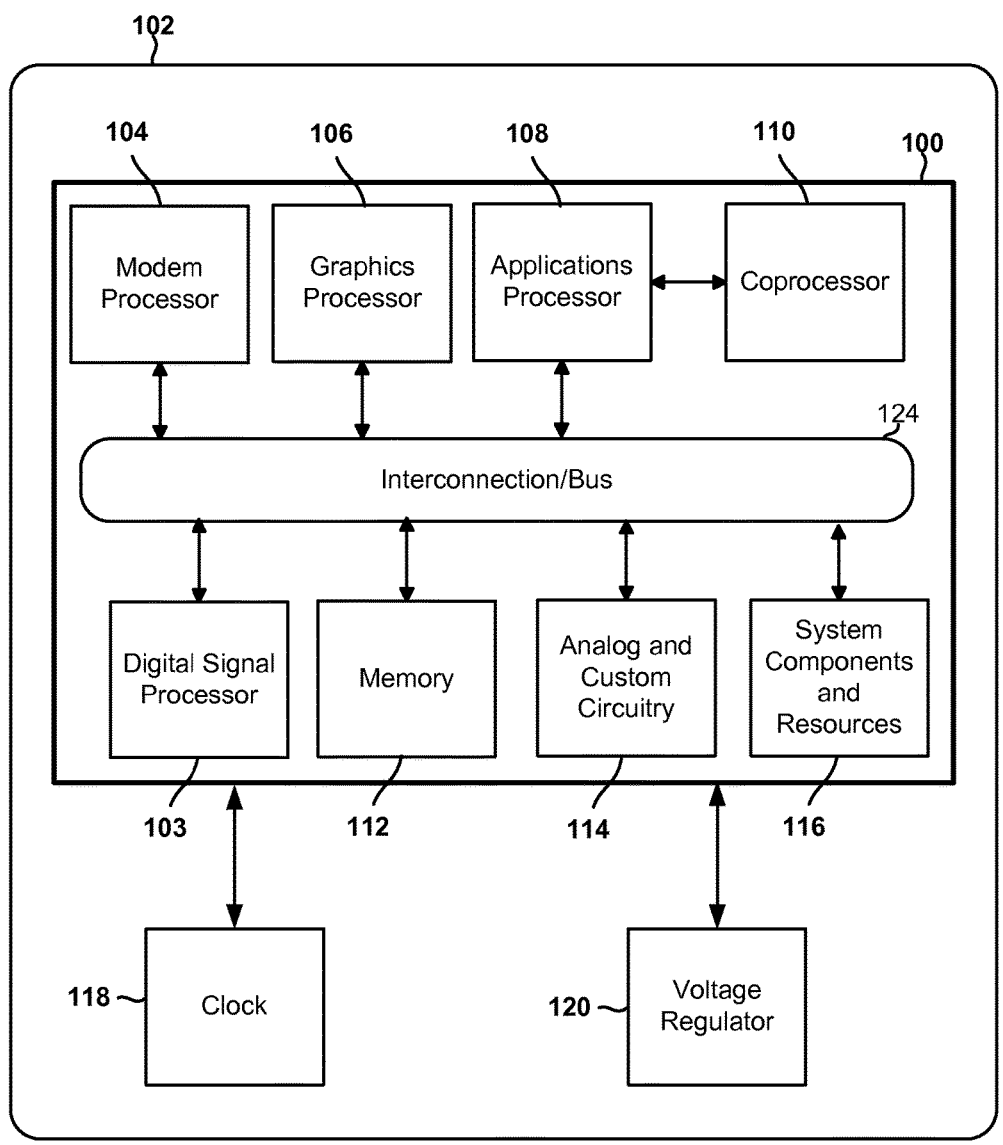
FIG. 1 is a block diagram illustrating components of an example system on chip that may be included in a computing device configured to use multi-label classification or meta-classification techniques to classify benign, suspicious, and non-benign behaviors into categories, sub-categories, groups, or sub-groups in accordance with various embodiments of this disclosure.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, various embodiments of the disclosure include methods, and computing devices configured to implement the methods, of efficiently identifying, classifying, modeling, preventing, and/or correcting the conditions and behaviors that often degrade a computing device's performance, power utilization levels, network usage levels, security and/or privacy over time. The computing device may be equipped with a behavioral monitoring and analysis system that is configured to use behavior-based and machine learning techniques to efficiently classify device behaviors into various categories, for example, as benign, suspicious, or non-benign. The computing device may be further configured to use multi-label classification or meta-classification techniques to further classify (e.g., sub-classify, categorize, label, etc.) the broader categories of behaviors (i.e., benign, suspicious or non-benign), into additional categories, sub-categories, groups or sub-groups. The computing device may determine the relative importance of a particular behavior (e.g., the severity of risk or threat that a software application or behavior poses to the proper functioning of the device, etc.) based, at least in part, on that behavior's sub-classifications (e.g., based, at least in part, on the categories, groups or labels associated with the behavior), display a prompt that identifies the reasons that the behavior was determined to be suspicious (e.g., it's adware, etc.) and/or its relative importance, and request the user to select whether to whitelist the application associated with the detected behavior.

Sub-classifying the broader categories allows the computing device to present the user with more useful or meaningful information about a particular behavior which in turn, allows the user to have more control over how the device analyzes and responds to that behavior. For example, if an adware program is included in a game that the user enjoys playing, instead of automatically terminating the game when the adware program is detected, the system may present information about the adware to the user and allow the user to decide whether the benefits of playing the game outweigh its negative characteristics (e.g., displaying of a large number of ads, etc.). If the user decides to continue with the game, the system may allow the user to whitelist the behavior of presenting adware during the.

As used herein, the term "whitelisting" refers to a process in which a behavior exhibited by a software application that is evaluated to be a suspicious or non-benign behavior is added to a "white list" or a "whitelist database" so that the application may continue operating on the device.

Conventional solutions utilizing "whitelists" typically add the entire software application to a white list (i.e., whitelist the entire application). Once whitelisted, the device will cease further monitoring or analysis of software applications, and will cease displaying prompts or otherwise notifying the user of suspicious or non-benign activities associated with whitelisted software applications. Whitelisting an entire application may allow malware and other non-benign software applications to (intentionally or inadvertently) circumvent detection by a behavior-based security system. For example, a malicious software application may initially perform operations that the behavior-based system will classify as a low risk or non-benign behavior, or which the user is likely to allow (e.g., displaying ads, sending an International Mobile Equipment Identity (IMEI) number to remote server, etc.). The malware may wait for the user to whitelist the application before performing more severe, critical or malicious operations, such as sending financial information from a banking application to a server or accessing the device's contacts list without the user's knowledge or consent. Since the application has been whitelisted, the user will not receive further notifications about the non-benign behaviors.

In accordance with this disclosure, the computing device may be configured to whitelist individual behaviors of a software application. In some embodiments, a computing device may be configured to monitor activities of a software application operating on the computing device to collect behavior information. The computing device may use the collected behavior information to generate a behavior vector information structure that characterizes a behavior of the software application. The computing device may apply the behavior vector information structure to a machine learning classifier model to generate analysis results. The computing device may use the analysis results to classify the behavior vector information structure (or the activities/behavior characterized by the behavior vector information structure) into categories such as benign, suspicious or non-benign. The computing device may also use the analysis results to sub-classify the behavior vector information structure into one or more categories (e.g., game, adware, applications that send IMEI numbers to servers, etc.). The computing device may display/render a prompt that displays the classification and sub-classifications of the behavior (and thus the reasons that the behavior was determined to be suspicious or non-benign), and request the user to select whether to whitelist the behavior or the software application (i.e., whether the benefits of using that application outweigh its negative characteristics). In response to receiving a user input indicating that the behavior is to be whitelisted, the computing device may add the behavior to the white list (e.g., by storing the behavior vector information structure and the analysis/classification results in a whitelist database in association with the software application). With the behavior whitelisted, the computing device may cease displaying prompts or otherwise notifying the user of other incidences of that behavior. In some implementations, the computing device may also cease displaying other suspicious or non-benign behaviors of that software application and/or other behaviors that are classified in the same sub-categories as the whitelisted behavior. By whitelisting a behavior or monitored activity of an application, the behavior analysis system will no longer need to monitor or analyze the same behavior or activity for the software application. This can potentially lead to lowering overhead processing by the system, especially if the whitelisted behavior is common, such as location tracking.

In order to monitor for whitelisted applications that later exhibit non-benign behavior, the computing device may continue monitoring and analyzing the activities or behaviors of the software application, classify another or different behaviors as suspicious or non-benign, and determine that this behavior is not included in the whitelist (e.g., this second behavior is not sub classified into the same sub-categories as any behavior included in the whitelist for this application, etc.). In response to such a determination, the computing device may display a second prompt that indicates to the user that the previously whitelisted application is engaged in additional or different behaviors that are suspicious or non-benign. In response to receiving a user input in response to the prompt, the computing device can use the received user input to determine whether to whitelist the newly detected behavior or terminate (or otherwise respond to) the software application.

By whitelisting individual behaviors (as opposed to entire software applications), intentional or inadvertent circumvention of detection of undesirable behaviors of a whitelisted software application can be prevented. Additional improvements to the functions, functionalities, and/or functioning of computing devices will be evident from the detailed descriptions of the embodiments provided below.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various embodiments are particularly useful for mobile computing devices, such as smartphones, which have limited resources and run on battery, the embodiments are generally useful in any electronic device that includes a processor and executes application programs.

The term "performance degradation" is used in this application to refer to a wide variety of undesirable operations and characteristics of a computing device, such as longer processing times, slower real time responsiveness, lower battery life, loss of private data, malicious economic activity (e.g., sending unauthorized premium Short Message Service (SMS) message), denial of service (DoS), poorly written or designed software applications, malicious software, malware, viruses, fragmented memory, operations relating to commandeering the computing device or utilizing the device for spying or botnet activities, etc. Also, behaviors, activities, and conditions that degrade performance for any of these reasons are referred to herein as "not benign" or "non-benign."

Many modern computing devices are resource constrained systems that have limited processing, memory, and energy resources. For example, a mobile device is a complex and resource-constrained computing device that includes many features or factors that could contribute to its degradation in performance and power utilization levels over time. Examples of factors that may contribute to this performance degradation include poorly designed software applications, malware, viruses, fragmented memory, and background processes. Due to the number, variety, and complexity of these factors, it is often not feasible to evaluate all of the various components, behaviors, processes, operations, conditions, states, or features (or combinations thereof) that may degrade performance and/or power utilization levels of these complex yet resource-constrained systems. As such, it is difficult for users, operating systems, or application programs (e.g., anti-virus software, etc.) to accurately and efficiently identify the sources of such problems. As a result, users of mobile and other resource-constrained computing devices currently have few remedies for preventing the degradation in performance and power utilization levels of their devices over time, or for restoring an aging device to its original performance and power utilization levels.

To overcome the limitations of conventional solutions, computing devices may be equipped with a behavioral monitoring and analysis system (e.g., a behavior-based security system) that is configured to identify behaviors and software applications that are non-benign (e.g., applications that are malicious, poorly written, incompatible with the device, etc.), and prevent such behaviors/applications from degrading the device's performance, power utilization levels, network usage levels, security, and/or privacy over time. By using behavior-based and machine learning techniques, the behavioral monitoring and analysis system may identify, prevent, correct, and/or otherwise respond to identified problems without having a significant, negative, or user perceivable impact on the responsiveness, performance, or power consumption characteristics of the computing device. As such, the system is well suited for inclusion and use in mobile and resource constrained-computing devices, such as smartphones, which have limited resources, run on battery power, and for which performance and security are important.

In the various embodiments, the behavioral monitoring and analysis system may include an observer process, daemon, module, or sub-system (herein collectively referred to as a "module"), a behavior extractor module, an analyzer module, and actuator module. The observer module may be configured to instrument or coordinate various application programming interfaces (APIs), registers, counters, or other device components (herein collectively "instrumented components") at various levels of the computing device system, collect behavior information from the instrumented components, and communicate (e.g., via a memory write operation, function call, etc.) the collected behavior information to the behavior extractor module.

The behavior extractor module may use the collected behavior information to generate behavior vectors that each represent or characterize one or more observed behaviors associated with a specific software application, module, component, task, or process of the computing device. Each behavior vector may encapsulate one or more "behavior features." Each behavior feature may include an abstract number or symbol that represents all or a portion of an observed behavior. In addition, each behavior feature may be associated with a data type that identifies a range of possible values, operations that may be performed on those values, meanings of the values, etc. A computing device may use the data type to determine how the feature (or feature value) should be measured, analyzed, weighted, used, etc.

The behavior extractor module may communicate (e.g., via a memory write operation, function call, etc.) the behavior vectors to the analyzer module, which may apply the behavior vectors to classifier models to generate analysis results that may be used to determine whether a software application or device behavior is benign or non-benign. A classifier model may be a behavior model that includes data and/or information structures (e.g., decision nodes, feature vectors, component lists, etc.) that may be used by the computing device processor to evaluate a specific factor, feature, or embodiment of the device's behavior. A classifier model may also include decision criteria for monitoring or analyzing a number of features, factors, data points, entries, APIs, states, conditions, behaviors, software applications, processes, operations, components, etc. (herein collectively "features") in the computing device.

A full classifier model may be a robust data model that is generated as a function of a large training dataset, which may include thousands of features and billions of entries. A lean classifier model may be a more focused data model that is generated from a reduced dataset that includes or prioritizes tests on the features/entries that are most relevant for determining whether a particular mobile device behavior is not benign. A locally generated lean classifier model is a lean classifier model that is generated in the computing device. A reduced feature model (RFM) may be a lean classifier model that is generated based, at least in part, on a more robust classifier model to include the decision nodes that evaluate the features that are most important for determining whether a behavior of that device is benign or non-benign.

The analyzer module may notify the actuator module when it determines with a high degree of confidence (e.g., based, at least in part, on the analysis results, etc.) that a behavior or software application is non-benign. In response, the actuator module may perform various operations to heal, cure, isolate, or otherwise fix the identified problem(s). For example, the actuator module may be configured to quarantine a software application that is determined to be malware, terminate a malicious process, display a prompt requesting that the user select whether to uninstall or whitelist an application (or whitelist a behavior of that application) determined to be non-benign, notify the user that a software application is contributing to the device's performance degradation over time, etc.

Monitoring, analyzing, and otherwise responding to every potential non-benign behavior may consume a significant amount of the device's limited processing, memory, or energy resources. For example, there may be thousands of features/factors and billions of data points that require monitoring or analysis in order to properly identify the cause or source of a computing device's degradation over time. In resource-constrained computing devices, such as smartphones, it is often not feasible to evaluate all these features, factors and data points.

To reduce the number of features, factors and data points that require evaluation when determining whether a behavior is benign, suspicious, or non-benign, the behavioral monitoring and analysis system may perform progressive, dynamic, and adaptive operations. For example, the system may be configured to use classifier models of varying levels of complexity (or "leanness") to progressively evaluate device behaviors in stages. This allows the device to forgo performing spurious operations and reduces the number of behavior vectors that are generated or used by the system.

For example, in some embodiments, the system may be configured to generate and use a family of classifier models that includes an initial classifier, and model and one or more subsequent classifier models. The initial classifier model may be a lean classifier model (or a reduced features model) that focuses on evaluating a targeted subset of all the features, factors, and data points that would otherwise require analysis when classifying a mobile device behavior. Said another way, the initial classifier model may include decision nodes for evaluating an initial set of factors/features that are determined to have a high probability of enabling the system to determine whether a device behavior is benign or non-benign with a high degree of confidence. Each subsequent classifier model may be a more robust classifier that includes a larger number of decision nodes and/or evaluates a larger subset of the features, factors, and data points than its preceding classifier model.

The system may apply behavior vectors to the initial classifier model to generate initial analysis results, determine whether the initial analysis results indicate whether the behavior is benign or non-benign with a high degree of confidence, classify the behavior as suspicious in response to determining that the behavior cannot be classified as either benign or non-benign with a high degree of confidence, apply the same or different behavior vectors to progressively larger or more robust classifier models to generate new or first monitored activity additional analysis results (e.g., in response to determining that the behavior is suspicious), and determine whether the new/additional analysis results indicate whether the behavior is benign or non-benign with a high degree of confidence. The system may perform these operations continuously or repeatedly until the analysis results indicate with a high degree of confidence that the behavior is benign or non-benign, until all of the classifier models in the family have been used, until a processing or battery consumption threshold is reached, or until the system determines that the source of the suspicious or performance-degrading behavior cannot be identified from the use of larger or more robust classifier models or from further analysis of the collected behavior information.

In addition, the system may be configured to perform/collect coarse observations and determine whether to perform/collect additional or more detailed observations based, at least in part, on a result of analyzing the coarse observations. The system may perform coarse observations by collecting behavior information from a small subset of all factors that could contribute to the mobile device's degradation over time, use this collected behavior information to generate behavior vectors, apply the generated behavior vectors to classifier models to generate analysis results, and determine whether the analysis results indicate whether the behavior is benign or non-benign with a high degree of confidence. The system may classify the behavior as suspicious in response to determining that the behavior cannot be classified with a high degree of confidence as benign or non-benign. In addition, the system may adjust the granularity of its observations (i.e., the level of detail at which the device behaviors are observed) and/or change the factors that are observed to collect new or additional behavior information, generate new behavior vectors based, at least in part, on the new or additional behavior information, apply the new behavior vectors to the same or different classifier models to generate additional analysis results, and determine whether the new/additional analysis results indicate with a high degree of confidence whether the behavior is benign or non-benign. The system may perform these operations repeatedly or continuously until the analysis results indicate with a high degree of confidence that the behavior is benign or non-benign, until a processing or battery consumption threshold is reached, or until the system determines that the source of the suspicious or performance-degrading behavior cannot be identified from further increases in observation granularity.

Generally, the above-described system may determine whether a behavior is benign, suspicious, or non-benign without consuming a significant amount of the device's limited resources. Yet, there are many different categories, sub-categories, or types for each of the benign, suspicious, and non-benign behavior classifications. For example, a behavior that is classified as a "non-benign behavior" may be categorized as malware, and sub-categorized as adware, a key logger, ransomware, spyware, mobile remote access Trojan (mRAT), botnet, phishing app, Trojan, SMS fraudware, etc. Each of these different malware sub-categories/types poses a different level, degree, or type of risk or threat to the user or the computing device. Said another way, the severity of the risk/threat that a detected or potential non-benign behavior poses to a computing device depends on its malware type (e.g., adware, Trojan, etc.).

In some implementations, computing device may be configured to use multi-label classification or meta-classification techniques to identify or determine the categories, subcategories, or types (e.g., game, news app, malware) that are associated with a classified behavior (e.g., benign, suspicious, or non-benign). For example, the computing device may be configured to use multi-label classification or meta-classification techniques to identify or determine the malware types (and thus risks) associated with a suspicious or non-benign behavior, to customize its analysis operations (e.g., the operations performed by the analyzer module, etc.) based, at least in part, on the malware types associated with a suspicious or non-benign behavior, and perform different actuation operations based, at least in part, on the malware types associated with a suspicious or non-benign behavior.

There are many different malware types and the severity of the risk/threat that a detected or potential non-benign behavior poses to a computing device may depend on its malware type. For example, adware is a type of malware that automatically renders advertisements on the device to generate revenue for its author. An adware application may secretly monitor the usage of the device, collect information regarding the Internet sites that the user visits, and display advertisements related to the types of goods or services featured on the visited Internet sites. Since adware applications typically do not collect or share highly confidential or personal information (e.g., photographs, contact lists, etc.), they are typically more of annoyance for the user than a security risk to the device. As such, the computing device may be configured to perform limited or lightweight analysis and/or actuation operations (i.e., to conserve its resources) when a suspicious or potentially non-benign behavior is sub-classified as adware.

Key loggers are a type of malware that monitor and log user inputs without the user's knowledge or consent. For example, a key logger may silently observe keystrokes to capture passwords, personal communications, etc. A key logger is typically more of security risk to the user/device than adware, but less of a security risk than many of the other types of malware (e.g., spyware, Botnet, etc.).

Ransomware is a type of malware that restricts access to the computing device (e.g., by locking the device, encrypting all of its files, etc.), and demands a ransom be paid to the creator before the restriction is removed (e.g., device is unlocked, filed are decrypted, etc.). A ransomware application may pose a significant financial threat to the user, is typically more of security risk than adware and key loggers.

Spyware and mRATs are types of malware that gather and send information about device or users without their knowledge or consent. For example, a spyware application may monitor a user's location and actions (by collecting information from the device's sensors), and send these values to an external server. As such, these malware types may pose a significant threat to the user's privacy, and are typically more of security risk to the device than adware, key loggers, and ransomware.

A botnet is typically a collection of Internet-connected application programs that communicate with other similar programs on other devices to perform one or more tasks, such as maintaining control of an Internet Relay Chat (IRC) channel, sending spam email messages, participating in large scale or distributed denial-of-service (DDoS) attacks, etc. A botnet may consume a significant amount of the computing device's available resources, and poses a significant threat to the device. A botnet may pose a severe threat to the device, and is typically a higher security risk to the user/device than adware, key loggers, ransomware, spyware, and mRATs.

Phishing is a cyber-attack technique and a type of malware that attempts to fool the user to acquire sensitive information (e.g., usernames, passwords, credit card details, etc.), typically via spoofing another application/website or pretending to be a trustworthy entity. For example, a phishing app may attempt to fool the user to enter personal information into a fake website or application that is almost identical to legitimate site/application, or may contain links to websites that are infected with malware. Phishing apps may pose a moderate to significant risk to the device, especially if the user is a child, senior citizen, or unfamiliar with such cyber-attack techniques.

A Trojan is a non-self-replicating type of malware that includes malicious code that, when executed, carries out actions determined by the nature of the Trojan, typically causing loss or theft of data. Typically, a Trojan pretends to be a legitimate application, but has hidden malicious functionality. For example, Trojans often acts as a backdoor, contacting other entities/devices to provide them with unauthorized access to the affected computing device. A Trojan may also consume a significant amount of the computing device's available processing, memory, and battery resources. For all these reasons, Trojans may pose a severe threat to the device and are a higher security risk than most other types of malware.

SMS Fraudware is a type of malware that attempts to send premium SMS messages without the user's knowledge or consent. SMS Fraudware may pose a significant financial threat to the user, is typically more of security risk than adware.

In some embodiments, a computing device may be configured to intelligently determine or select the analysis and/or actuation operations performed by the device based, at least in part, on the classification and sub-classifications (e.g., malware, adware, etc.) or determined relative importance of a behavior or software application. In various embodiments, the computing device may be configured to determine the sub-classifications by using a multi-classification classifier model and/or a meta-classifier model. In an embodiment, the multi-classification classifier model may include a meta-classifier model.

A multi-classification classifier model may a classifier model that supports multiple classification labels. For example, a multi-classification classifier model may include decision stumps (e.g., boosted decision stumps, etc.) that are each associated with one or more labels. Decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the condition tested by a boosted decision stump is "is the frequency of SMS transmissions less than x per minute," applying a value of "3" to the boosted decision stump will result in either a "yes" answer (for "less than 3" SMS transmissions) or a "no" answer (for "3 or more" SMS transmissions).

In addition to evaluating a condition and outputting an answer and a weight value (e.g., as part of the analysis results) for determining whether a behavior is benign or non-benign, each decision stump in a multi-classification classifier model may output an additional value (e.g., a probability value, etc.) for each of its associated labels. For example, applying a behavior vector to a multi-classification classifier model that includes the classification labels "adware," "spyware," "key-logger," "SMSFraud," and "ransomware" may cause the device to generate the following output:

[0.1, 0.9, 0.9, 0.2, 0.2].

An computing device implementing an embodiment system may use this output (i.e., label analysis result [0.1, 0.9, 0.9, 0.2, 0.2]) to determine that the evaluated behavior could be sub-classified as adware with 10% confidence, as spyware with 90% confidence, as key-logger with 90% confidence, as SMSFraud with 20% confidence, and as ransomware with 20% confidence. As a result, the device may determine that the behavior could be sub-classified as spyware and key-logger with a high degree of confidence (i.e., 90% confidence). In response, the computing device may sub-classify the behavior into the spyware and key-logger categories (e.g., by adding or associating labels to the behavior, etc.), determine the risk, threat, or security level associated with each of these categories, and determine/select the analysis and/or actuation operations that are to be performed based, at least in part, on the categories or their associated risk, threat or security level.

The computing device may be configured to make such sub-classification decisions/determinations in addition to, and independent of, its classification decisions/determinations of whether the device behavior is benign, suspicious or non-benign. For example, the computing device may apply a behavior vector to a multi-classification classifier model to generate classification analysis results and label analysis results, classify the behavior as suspicious based, at least in part, on the classification analysis results, sub-classify the behavior into the spyware and key-logger categories based, at least in part, on the label analysis results, increase its level of scrutiny (e.g., by using more robust classifier models, etc.) to generate more comprehensive analysis results, and use the more comprehensive analysis results to determine whether the behavior is benign or non-benign. If the behavior is classified as non-benign, the computing device may select or determine the appropriate actuation operations (e.g., prompt user, whitelist application, terminate process, etc.) based, at least in part, on the sub-classifications (e.g., spyware, key-logger, etc.).

In an embodiment, the computing device may be configured to determine the sub-classifications by using a meta-classifier model. A meta-classifier model may be a classifier model that includes decision nodes for testing or evaluating conditions or features suitable for determining sub-classifications for a behavior. A computing device may be configured to apply a behavior vector and the analysis results or classification output to the meta-classifier model to generate information that may be used to sub-classify a behavior into one or more categories. For example, a meta-classifier model may include decision node that evaluates a location feature, the result of which may be added to a spyware value. Similarly, the meta-classifier model may evaluate conditions related to the recording and communicating accelerometer readings, the results of which may be added to both a key-logger value and the spyware value. The meta-classifier model may also evaluate conditions for determining whether the behavior is an unknown type of malware (i.e., malware that does not fall under any of the existing or known categories).

In some embodiments, the computing device may be configured to use the behavior sub-classifications to determine the risk, threat, or suspicion level associated with a behavior, and select or modify a classifier model based, at least in part, on the determined risk, threat, or suspicion level. For example, the computing device may apply a behavior vector to a classifier model (e.g., the initial classifier model in a family of classifier models) to generate analysis results, use the analysis results to determine the conditions or features in the classifier model that are present in the device and to sub-classify the behavior, determine the risk, threat, or suspicion level associated with the behavior based, at least in part, on the sub-classification, and select a subsequent classifier model in the family of classifier models based, at least in part, on the determined risk, threat, or suspicion level. For instance, if the behavior is sub-classified as Ransomware or spyware, the computing device may bypass the intermediate RFMs or classifier models in the family of classifier models to select a full classifier model, full feature RFM, or more robust classifier model. Alternatively, if the behavior is sub-classified as Ransomware or spyware, the computing device may select a subsequent classifier model that include decision nodes that evaluate conditions determined to have a high probability of determining whether a behavior is Ransomware or spyware.

The computing device may be configured to alter other analysis operations based, at least in part, on the determined risk, threat, or suspicion level. For example, the computing device may be configured to stall the application before analyzing the queued up events in the memory and/or monitor the application more closely with respect to features that are not evaluated by the classifier model, such as memory usage and the contents of the memory.

The computing device may be configured to select and perform the actuation operations based, at least in part, on the determined risk, threat, or suspicion level. For example, since Adware is annoying but does not present immediate danger, after determining that a software application is Adware, the computing device could allow the application to continue to run/operate on the device, and prompt to user with a shortcut to uninstall the app. The computing device could immediately remove ransomware without displaying the ransom message (fake message example: "FBI has locked your phone, all activity of this phone has been recorded . . . "). That is, after determining that a software application is ransomware, the computing device may terminate the application and its message, inform the user that the message is fake or malicious and there is no need to worry, and recommend to the user that the application should be uninstalled. Similarly, the computing device could be configured to immediately inform the user of spyware such as mRATs.

The various embodiments may be implemented on a number of single processor and multiprocessor computer systems, including a system-on-chip (SOC). FIG. 1 illustrates an example system-on-chip (SOC) 100 architecture that may be used in computing devices implementing the various embodiments of this disclosure. The SOC 100 may include a number of heterogeneous processors, such as a digital signal processor (DSP) 103, a modem processor 104, a graphics processor 106, and an applications processor 108. The SOC 100 may also include one or more coprocessors 110 (e.g., vector co-processor) that are coupled (directly or indirectly) to one or more of the heterogeneous processors 103, 104, 106, 108. Each processor 103, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8).

The SOC 100 may also include analog and custom circuitry 114 for managing sensor data, analog-to-digital conversions, wireless data transmissions, and for performing other specialized operations, such as processing encoded audio and video signals for rendering in a web browser. The SOC 100 may further include system components and resources 116, such as voltage regulators, oscillators, phase-locked loops, peripheral bridges, data controllers, memory controllers, system controllers, access ports, timers, and other similar components used to support the processors and software clients (e.g., a web browser) running on a computing device.

The system components and resources 116 and/or analog and custom circuitry 114 may include circuitry to interface with peripheral devices, such as cameras, electronic displays, wireless communication devices, external memory chips, etc. The processors 103, 104, 106, 108 may be interconnected to one or more memory elements 112, system components and resources 116, and analog and custom circuitry 114 via an interconnection/bus module 124, which may include an array of reconfigurable logic gates and/or implement a bus architecture (e.g., CoreConnect, AMBA, etc.). Communications may be provided by interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., a DSP 103, a modem processor 104, a graphics processor 106, an applications processor 108, etc.).

In an embodiment, the SOC 100 may be included in a mobile device 102, such as a smartphone. The mobile device 102 may include communication links for communication with a telephone network, the Internet, and/or a network server. Communication between the mobile device 102 and the network server may be achieved through the telephone network, the Internet, private network, or any combination thereof.

In various embodiments, the SOC 100 may be configured to collect behavioral, state, classification, modeling, success rate, and/or statistical information in the mobile device, and send the collected information to the network server (e.g., via the telephone network) for analysis. The network server may use information received from the mobile device to generate, update or refine classifiers or data/behavior models that are suitable for use by the SOC 100 when identifying and/or classifying performance-degrading mobile device behaviors. The network server may send data/behavior models to the SOC 100, which may receive and use data/behavior models to identify suspicious or performance-degrading mobile device behaviors, software applications, processes, etc.

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, global positioning system (GPS) receivers, communications circuitry (e.g., Bluetooth®, WLAN, WiFi, etc.), and other well-known components (e.g., accelerometer, etc.) of modem electronic devices.

In addition to the mobile device 102 and SOC 100 discussed above, the various embodiments may be implemented in a wide variety of computing systems, which may include a single processor, multiple processors, multicore processors, or any combination thereof.

Figure 2A:
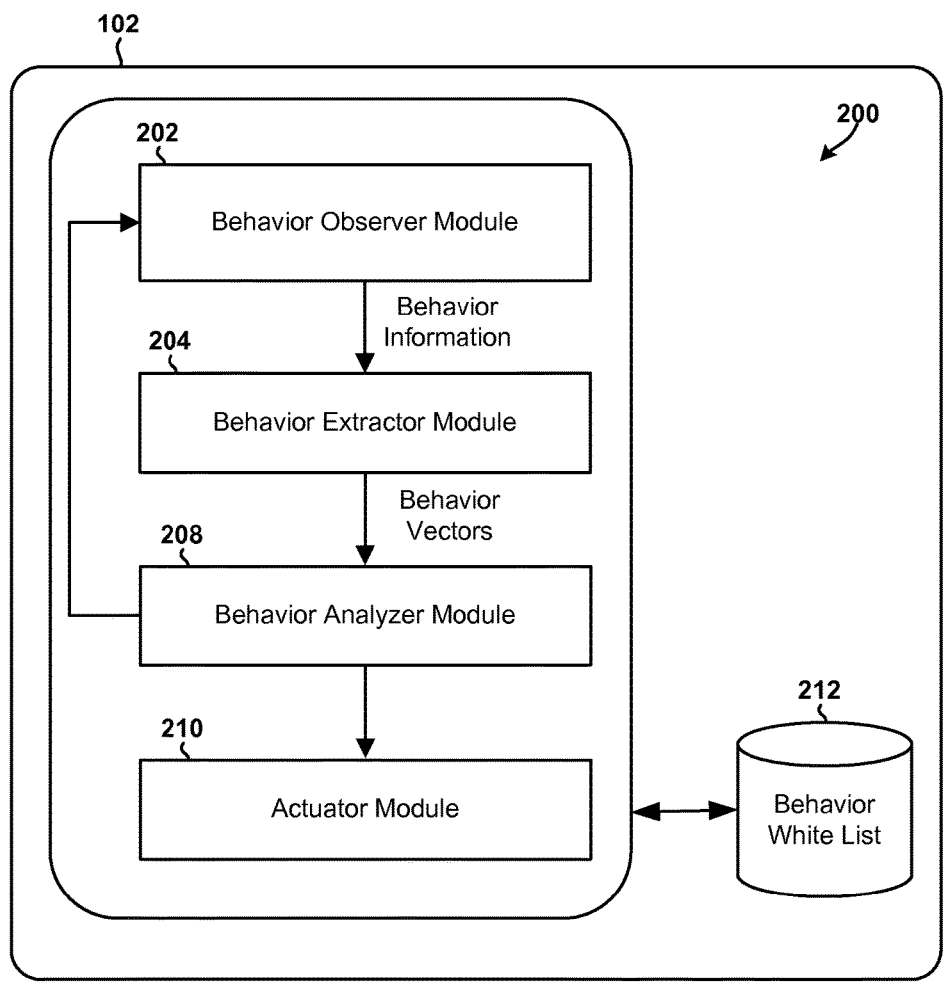
FIG. 2A is a block diagram illustrating example logical components and information flows in a mobile device configured to classify and sub-classify behaviors in accordance with various embodiments of this disclosure.

FIG. 2A illustrates example logical components and information flows in an embodiment computing device 102 that includes a behavior-based security system 200 configured to use behavioral analysis techniques to identify and respond to non-benign device behaviors. In the example illustrated in FIG. 2A, the computing device is a mobile computing device 102 that includes a device processor (i.e., mobile device processor) configured with executable instruction modules that include a behavior observer module 202, a behavior extractor module 204, a behavior analyzer module 208, an actuator module 210, and a behavior white list 212. Each of the modules 202-210 may be a thread, process, daemon, module, sub-system, or component that is implemented in software, hardware, or a combination thereof. In various embodiments, the modules 202-210 may be implemented within parts of the operating system (e.g., within the kernel, in the kernel space, in the user space, etc.), within separate programs or applications, in specialized hardware buffers or processors, or any combination thereof. In an embodiment, one or more of the modules 202-210 may be implemented as software instructions executing on one or more processors of the mobile computing device 102.

The behavior observer module 202 may be configured to instrument application programming interfaces (APIs), counters, hardware monitors, etc. at various levels/modules of the device, and monitor the activities, conditions, operations, and events (e.g., system events, state changes, etc.) at the various levels/modules over a period of time. For example, the behavior observer module 202 may be configured to monitor various software and hardware components of the mobile computing device 102, and collect behavior information pertaining to the interactions, communications, transactions, events, or operations of the monitored and measurable components that are associated with the activities of the mobile computing device 102. Such activities include a software application's use of a hardware component, performance of an operation or task, a software application's execution in a processing core of the mobile computing device 102, the execution of process, the performance of a task or operation, a device behavior, etc.

As a further example, the behavior observer module 202 may be configured to monitor the activities of the mobile computing device 102 by monitoring the allocation or use of device memory by the software applications. In an embodiment, this may be accomplished by monitoring the operations of a memory management system (e.g., a virtual memory manager, memory management unit, etc.) of the computing device. Such systems are generally responsible for managing the allocation and use of system memory by the various application programs to ensure that the memory used by one process does not interfere with memory already in use by another process. Therefore, by monitoring the operations of the memory management system, the device processor may collect behavior information that is suitable for use in determining whether two applications are working in concert, e.g., whether two processes have been allocated the same memory space, are reading and writing information to the same memory address or location, or are performing other suspicious memory-related operations.

The behavior observer module 202 may collect behavior information pertaining to the monitored activities, conditions, operations, or events, and store the collected information in a memory (e.g., in a log file, etc.). The behavior observer module 202 may then communicate (e.g., via a memory write operation, function call, etc.) the collected behavior information to the behavior extractor module 204.

In an embodiment, the behavior observer module 202 may be configured to monitor the activities of the mobile computing device 102 by monitoring the allocation or use of device memory at the hardware level and/or based, at least in part, on hardware events (e.g., memory read and write operations, etc.). In a further embodiment, the behavior observer module 202 may be implemented in a hardware module for faster, near-real time execution of the monitoring functions. For example, the behavior observer module 202 may be implemented within a hardware module that includes a programmable logic circuit (PLC) in which the programmable logic elements are configured to monitor the allocation or use of computing device memory at the hardware level and/or based, at least in part, on hardware events (e.g., memory read and write operations, etc.) and otherwise implement the various embodiments. Such a hardware module may output results of hardware event monitoring to the device processor implementing the behavior extractor module 204. A PLC may be configured to monitor certain hardware and implement certain operations of the various embodiments described herein using PLC programming methods that are well known. Other circuits for implementing some operation of the embodiment methods in a hardware module may also be used.

Similarly, each of the modules 202-210 may be implemented in hardware modules, such as by including one or PLC elements in a SoC with the PLC element(s) configured using PLC programming methods to perform some operation of the embodiment methods.

The behavior extractor module 204 may be configured to receive or retrieve the collected behavior information, and use this information to generate one or more behavior vectors. In the various embodiments, the behavior extractor module 204 may be configured to generate the behavior vectors to include a concise definition of the observed behaviors, relationships, or interactions of the software applications. For example, each behavior vector may succinctly describe the collective behavior of the software applications in a value or vector data-structure. The vector data-structure may include series of numbers, each of which signifies a feature, activity or a behavior of the device, such as whether a camera of the computing device is in use (e.g., as zero or one), how much network traffic has been transmitted from or generated by the computing device (e.g., 20 KB/sec, etc.), how many internet messages have been communicated (e.g., number of SMS messages, etc.), and/or any other behavior information collected by the behavior observer module 202. In an embodiment, the behavior extractor module 204 may be configured to generate the behavior vectors so that they function as an identifier that enables the computing device system (e.g., the behavior analyzer module 208) to quickly recognize, identify, or analyze the relationships between applications.

The behavior analyzer module 208 may be configured to apply the behavior vectors to classifier modules to identify the nature of the relationship between two or more software applications. The behavior analyzer module 208 may also be configured to apply the behavior vectors to classifier modules to determine whether a collective device behavior (i.e., the collective activities of two or more software applications operating on the device) is a non-benign behavior that is contributing to (or is likely to contribute to) the device's degradation over time and/or which may otherwise cause problems on the device.

The behavior analyzer module 208 may notify the actuator module 210 that an activity or behavior is not benign. In response, the actuator module 210 may perform various actions or operations to heal, cure, isolate, or otherwise fix identified problems. For example, the actuator module 210 may be configured to stop or terminate one or more of the software applications when the result of applying the behavior vector to the classifier model (e.g., by the analyzer module) indicates that the collective behavior of the software application is not benign.

In various embodiments, the behavior observer module 202 may be configured to monitor the activities of the mobile computing device 102 by collecting information pertaining to library application programming interface (API) calls in an application framework or run-time libraries, system call APIs, file-system and networking subsystem operations, device (including sensor devices) state changes, and other similar events. In addition, the behavior observer module 202 may monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor the activities of the mobile computing device 102 by monitoring data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the activities of the mobile computing device 102 by monitoring the system resource usage, which may include monitoring the number of forks, memory access operations, number of files open, etc. The behavior observer module 202 may monitor the state of the mobile computing device 102, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor the activities of the mobile computing device 102 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device 102.

The behavior observer module 202 may also monitor the activities of the mobile computing device 102 by monitoring one or more hardware counters that denote the state or status of the mobile computing device 102 and/or computing device sub-systems. A hardware counter may include a special-purpose register of the processors/cores that is configured to store a count value or state of hardware-related activities or events occurring in the mobile computing device 102.

The behavior observer module 202 may also monitor the activities of the mobile computing device 102 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor the activities of the mobile computing device 102 by monitoring transmissions or communications of the mobile computing device 102, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may also monitor the activities of the mobile computing device 102 by monitoring the usage of, and updates/changes to, compass information, computing device settings, battery life, gyroscope information, pressure sensors, magnet sensors, screen activity, etc. The behavior observer module 202 may monitor notifications communicated to and from a software application (AppNotifications), application updates, etc. The behavior observer module 202 may monitor conditions or events pertaining to a first software application requesting the downloading and/or install of a second software application. The behavior observer module 202 may monitor conditions or events pertaining to user verification, such as the entry of a password, etc.

The behavior observer module 202 may also monitor the activities of the mobile computing device 102 by monitoring conditions or events at multiple levels of the mobile computing device 102, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile computing device 102 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device 102. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the mobile computing device 102 is in a holster may be relevant to recognizing suspicious behaviors, for example, because activities and functions related to active usage by a user (e.g., taking photographs or videos, sending messages, conducting a voice call, recording sounds, etc.) occurring while the mobile computing device 102 is holstered could be signs of nefarious processes executing on the device (e.g., to track or spy on the user).

Other examples of sensor level observations related to usage or external environments may include, detecting near field communication (NFC) signaling, collecting information from a credit card scanner, barcode scanner, or mobile tag reader, detecting the presence of a Universal Serial Bus (USB) power charging source, detecting that a keyboard or auxiliary device has been coupled to the mobile computing device 102, detecting that the mobile computing device 102 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device 102 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device 102, etc.

To reduce the number of factors monitored to a manageable level, in an embodiment, the behavior observer module 202 may be configured to perform coarse observations by monitoring/observing an initial set of behaviors or factors that are a small subset of all factors that could contribute to the computing device's degradation. In an embodiment, the behavior observer module 202 may receive the initial set of behaviors and/or factors from a server and/or a component in a cloud service or network. In an embodiment, the initial set of behaviors/factors may be specified in machine learning classifier models.

Each classifier model may be a behavior model that includes data and/or information structures (e.g., feature vectors, behavior vectors, component lists, etc.) that may be used by a computing device processor to evaluate a specific feature or embodiment of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes, evaluates, or tests only the features/entries that are most relevant for determining whether a particular activity is an ongoing critical activity and/or whether a particular computing device behavior is not benign. As an example, a device processor may be configured to receive a full classifier model from a network server, generate a lean classifier model in the computing device based, at least in part, on the full classifier, and use the locally generated lean classifier model to classify a behavior of the device as being either benign or non-benign (e.g., malicious, performance degrading, etc.).

A locally generated lean classifier model is a lean classifier model that is generated in the computing device. Because a computing devices (e.g., mobile devices, etc.) may be configurable and complex, the features that are most important for determining whether a particular device behavior is non-benign (e.g., malicious or performance-degrading) may be different for each device. Further, because each device may use a different combination of features, each device may require its own monitoring and/or analysis in order to quickly and efficiently classify a particular behavior, e.g., as non-benign, benign, or suspicious. Yet, the precise combination of features that require monitoring and analysis, and the relative priority or importance of each feature or feature combination, can often only be determined using information obtained from the specific device in which the behavior is to be monitored or analyzed. For these and other reasons, in an embodiment, classifier models may be generated in the computing device in which the models are used. These local classifier models allow the device processor to accurately identify the specific features that are most important in determining whether a behavior on that specific device is non-benign (e.g., contributing to that device's degradation in performance). The local classifier models also allow the device processor to prioritize the features that are tested or evaluated in accordance with their relative importance to classifying a behavior in that specific device.

A device-specific classifier model is a classifier model that includes a focused data model that includes, evaluates, or tests only the computing device-specific features/entries that are determined to be most relevant to classifying an activity or behavior in a specific computing device. An application-specific classifier model is a classifier model that includes a focused data model that includes, evaluates, or tests only the features/entries that are most relevant for evaluating a particular software application. By dynamically generating application-specific classifier models locally in the computing device, the device processor can focus its monitoring and analysis operations on a small number of features that are most important for determining whether the operations of a specific software application are contributing to an undesirable or performance degrading behavior of that device.

A multi-application classifier model may be a local classifier model that includes a focused data model that includes or prioritizes tests on the features/entries that are most relevant for determining whether the collective behavior of two or more specific software applications (or specific types of software applications) is non-benign. A multi-application classifier model may include an aggregated feature set and/or decision nodes that test/evaluate an aggregated set of features. The device processor may be configured to generate a multi-application classifier model by identifying the device features that are most relevant for identifying the relationships, interactions, and/or communications between two or more software applications operating on the computing device, identifying the test conditions that evaluate one of identified device features, determining the priority, importance, or success rates of the identified test conditions, prioritizing or ordering the identified test conditions in accordance with their importance or success rates, and generating the classifier model to include the identified test conditions so that they are ordered in accordance with their determined priorities, importance, or success rates. The device processor may also be configured to generate a multi-application classifier model by combining two or more application-specific classifier models.

In various embodiments, the device processor may be configured to generate a multi-application classifier model in response to determine that two or more applications are colluding or working in concert or that applications should be analyzed together as a group. The device processor may be configured to generate a multi-application classifier model for each identified group or class of applications. However, analyzing every group may consume a significant amount of the device's limited resources. Therefore, in an embodiment, the device processor may be configured to determine the probability that an application is engaged in a collusive behavior (e.g., based, at least in part, on its interactions with the other applications, etc.), and intelligently generate the classifier models for only the groups that include software applications for which there is a high probability of collusive behavior.

The behavior analyzer module 208 may be configured to apply the behavior vectors generated by the behavior extractor module 204 to a classifier model to determine whether a monitored activity (or behavior) is benign or non-benign. In an embodiment, the behavior analyzer module 208 may classify a behavior as "suspicious" when the results of its behavioral analysis operations do not provide sufficient information to classify the behavior as either benign or non-benign.

The behavior analyzer module 208 may be configured to notify the behavior observer module 202 in response to identifying the colluding software applications, determining that certain applications should be evaluated as a group, and/or in response to determining that a monitored activity or behavior is suspicious. In response, the behavior observer module 202 may adjust the granularity of its observations (i.e., the level of detail at which computing device features are monitored) and/or change the applications/factors/behaviors that are monitored based, at least in part, on information received from the behavior analyzer module 208 (e.g., results of the real-time analysis operations), generate or collect new or additional behavior information, and send the new/additional information to the behavior analyzer module 208 for further analysis/classification.

Such feedback communications between the behavior observer module 202 and the behavior analyzer module 208 enable the mobile computing device 102 to recursively increase the granularity of the observations (i.e., make finer or more detailed observations) or change the features/behaviors that are observed until a collective behavior is classified as benign or non-benign, a source of a suspicious or performance-degrading behavior is identified, until a processing or battery consumption threshold is reached, or until the device processor determines that the source of the suspicious or performance-degrading device behavior cannot be identified from further changes, adjustments, or increases in observation granularity. Such feedback communication also enable the mobile computing device 102 to adjust or modify the behavior vectors and classifier models without consuming an excessive amount of the computing device's processing, memory, or energy resources.

The behavior observer module 202 and the behavior analyzer module 208 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. This allows the mobile computing device 102 to efficiently identify and prevent problems without requiring a large amount of processor, memory, or battery resources on the device.

In various embodiments, the device processor of the mobile computing device 102 may be configured to identify a critical data resource that requires close monitoring, monitor (e.g., via the behavior observer module 202) API calls made by software applications when accessing the critical data resource, identify a pattern of API calls as being indicative of non-benign behavior by two or more software applications, generate a behavior vector based, at least in part, on the identified pattern of API calls and resource usage, use the behavior vector to perform behavior analysis operations (e.g., via the behavior analyzer module 208), and determine whether one or more of the software application is non-benign based, at least in part, on the behavior analysis operations.

In an embodiment, the device processor may be configured to identify APIs that are used most frequently by software applications operating on the computing device, store information regarding usage of identified hot APIs in an API log in a memory of the device, and perform behavior analysis operations based, at least in part, on the information stored in the API log to identify a non-benign behavior.

In the various embodiments, the mobile computing device 102 may be configured to work in conjunction with a network server to intelligently and efficiently identify the features, factors, and data points that are most relevant to determining whether an activity or behavior is non-benign. For example, the device processor may be configured to receive a full classifier model from the network server, and use the received full classifier model to generate lean classifier models (i.e., data/behavior models) that are specific for the features and functionalities of the computing device or the software applications operating on the device. The device processor may use the full classifier model to generate a family of lean classifier models of varying levels of complexity (or "leanness"). The leanest family of lean classifier models (i.e., the lean classifier model based, at least in part, on the fewest number of test conditions) may be applied routinely until a behavior is encountered that the model cannot categorize as either benign or not benign (and therefore is categorized by the model as suspicious), at which time a more robust (i.e., less lean) lean classifier model may be applied in an attempt to categorize the behavior. The application of ever more robust lean classifier models within the family of generated lean classifier models may be applied until a definitive classification of the behavior is achieved. In this manner, the device processor can strike a balance between efficiency and accuracy by limiting the use of the most complete, but resource-intensive lean classifier models to those situations where a robust classifier model is needed to definitively classify a behavior.

In various embodiments, the device processor may be configured to generate lean classifier models by converting a finite state machine representation/expression included in a full classifier model into boosted decision stumps. The device processor may prune or cull the full set of boosted decision stumps based, at least in part, on device-specific features, conditions, or configurations to generate a classifier model that includes a subset of boosted decision stumps included in the full classifier model. The device processor may then use the lean classifier model to intelligently monitor, analyze and/or classify a computing device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are parallelizable, meaning that many stumps may be applied or tested in parallel/at the same time (e.g., by multiple cores or processors in the computing device), thereby increase efficiency.

In an embodiment, the device processor may be configured to generate a lean classifier model that includes a subset of classifier criteria included in the full classifier model and only those classifier criteria corresponding to the features relevant to the computing device configuration, functionality, and connected/included hardware. The device processor may use this lean classifier model(s) to monitor only those features and functions present or relevant to the device. The device processor may then periodically modify or regenerate the lean classifier model(s) to include or remove various features and corresponding classifier criteria based, at least in part, on the computing device's current state and configuration.

As an example, the device processor may be configured to receive a large boosted-decision-stumps classifier model that includes decision stumps associated with a full feature set of behavior models (e.g., classifiers), and derive one or more lean classifier models from the large classifier models by selecting only features from the large classifier model(s) that are relevant to the computing device's current configuration, functionality, operating state and/or connected/included hardware, and including in the lean classifier model a subset of boosted decision stumps that correspond to the selected features. In this embodiment, the classifier criteria corresponding to features relevant to the computing device may be those boosted decision stumps included in the large classifier model that test at least one of the selected features. The device processor may then periodically modify or regenerate the boosted decision stumps lean classifier model(s) to include or remove various features based, at least in part, on the computing device's current state and configuration so that the lean classifier model continues to include application-specific or device-specific feature boosted decision stumps.

In addition, the device processor may also dynamically generate application-specific classifier models that identify conditions or features that are relevant to specific software applications (Google® wallet and eTrade®) and/or to a specific type of software application (e.g., games, navigation, financial, news, productivity, etc.). These classifier models may be generated to include a reduced and more focused subset of the decision nodes that are included in the full classifier model (or of those included in a leaner classifier model generated from the received full classifier model). These classifier models may be combined to generate multi-application classifier models.

In various embodiments, the device processor may be configured to generate application-based classifier models for each software application in the system and/or for each type of software application in the system. The device processor may also be configured to dynamically identify the software applications and/or application types that are a high risk or susceptible to abuse (e.g., financial applications, point-of-sale applications, biometric sensor applications, etc.), and generate application-based classifier models for only the software applications and/or application types that are identified as being high risk or susceptible to abuse. In various embodiments, device processor may be configured to generate the application-based classifier models dynamically, reactively, proactively, and/or every time a new application is installed or updated.

Each software application generally performs a number of tasks or activities on the computing device. The specific execution state in which certain tasks/activities are performed in the computing device may be a strong indicator of whether a behavior or activity merits additional or closer scrutiny, monitoring and/or analysis. As such, in the various embodiments, the device processor may be configured to use information identifying the actual execution states in which certain tasks/activities are performed to focus its behavioral monitoring and analysis operations, and better determine whether an activity is a critical activity and/or whether the activity is non-benign.

In various embodiments, the device processor may be configured to associate the activities/tasks performed by a software application with the execution states in which those activities/tasks were performed. For example, the device processor may be configured to generate a behavior vector that includes the behavior information collected from monitoring the instrumented components in a sub-vector or data-structure that lists the features, activities, or operations of the software for which the execution state is relevant (e.g., location access, SMS read operations, sensor access, etc.). In an embodiment, this sub-vector/data-structure may be stored in association with a shadow feature value sub-vector/data-structure that identifies the execution state in which each feature/activity/operation was observed. As an example, the device processor may generate a behavior vector that includes a "location background" data field whose value identifies the number or rate that the software application accessed location information when it was operating in a background state. This allows the device processor to analyze this execution state information independent of and/or in parallel with the other observed/monitored activities of the computing device. Generating the behavior vector in this manner also allows the system to aggregate information (e.g., frequency or rate) over time.

In various embodiments, the device processor may be configured to generate the behavior vectors to include information that may be input to a decision node in the machine learning classifier to generate an answer to a query regarding the monitored activity.

In various embodiments, the device processor may be configured to generate the behavior vectors to include execution information. The execution information may be included in the behavior vector as part of a behavior (e.g., camera used 5 times in 3 second by a background process, camera used 3 times in 3 second by a foreground process, etc.) or as part of an independent feature. In an embodiment, the execution state information may be included in the behavior vector as a shadow feature value sub-vector or data structure. In an embodiment, the behavior vector may store the shadow feature value sub-vector/data structure in association with the features, activities, tasks for which the execution state is relevant.

Figure 2B:
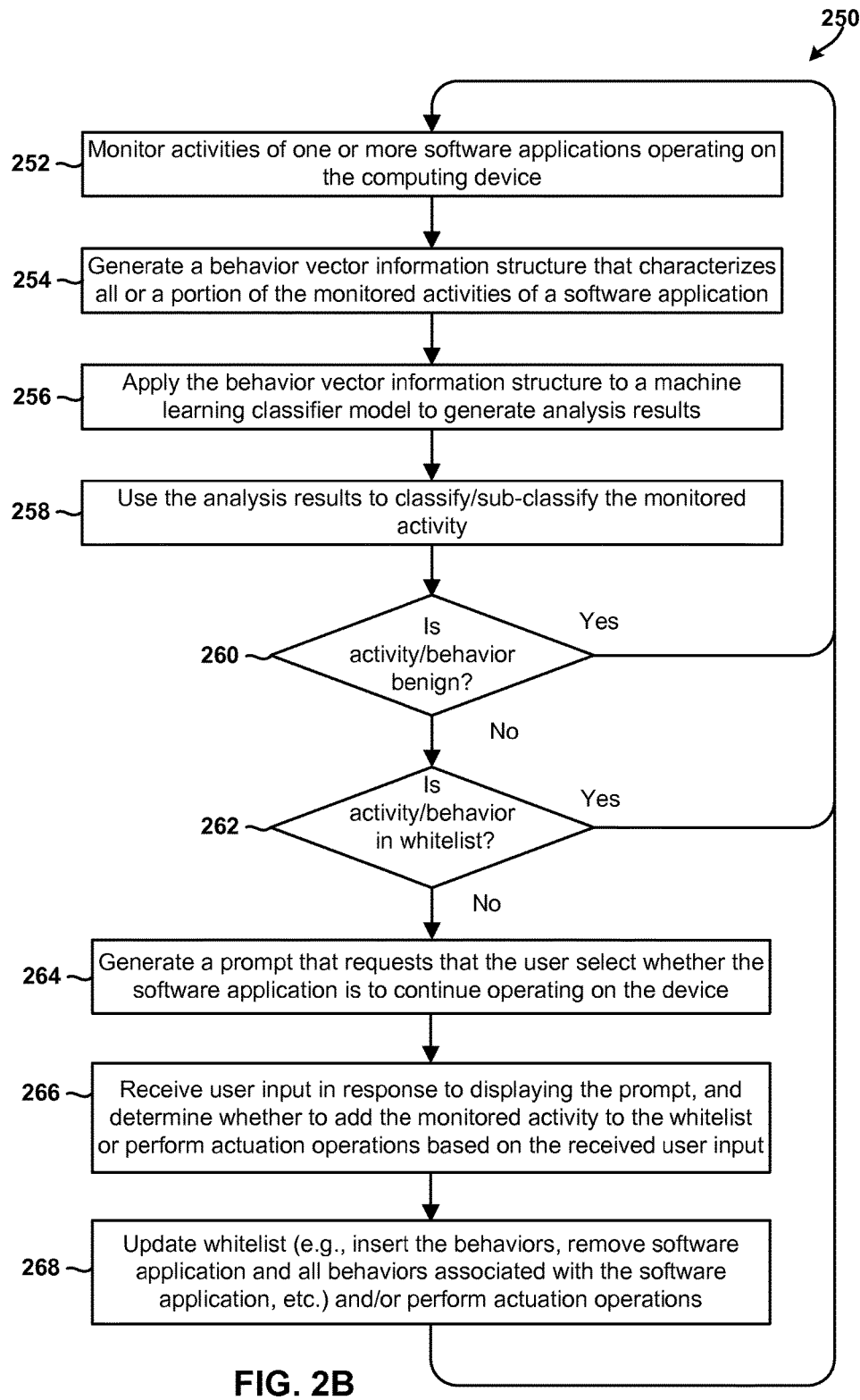
FIG. 2B is a process flow diagram illustrating a method of selectively whitelisting various behaviors in accordance with an embodiment of this disclosure.

FIG. 2B illustrates a method 250 of whitelisting device behaviors by a behavior-based system that is configured to use machine learning techniques to efficiently identify, classify, model, prevent, and/or correct the conditions and behaviors that may degrade a computing device's performance, power utilization levels, network usage levels, security and/or privacy. The method 250 may be performed by a processor or processing core in a resource constrained computing device, such as a mobile device.

In block 252, the processing core may monitor activities of a software application operating on the computing device (e.g., via the behavior observer module 202 discussed above with reference to FIG. 2A). In block 254, the processing core may generate a behavior vector information structure that characterizes all or a portion of the monitored activities (e.g., via the behavior extractor module 204).

In block 256, the processing core may apply the behavior vector information structure to a machine learning classifier model to generate analysis results (e.g., via the behavior analyzer module 208). In block 258, the processing core may use the analysis results to classify/sub-classify the behavior vector (and thus the activities/behaviors characterized by the behavior vector information structure). For example, the processing core may classify behavior vector information structure as benign, suspicious or non-benign, and sub-classify as being a game, adware, etc. In some embodiments, the processing core may also determine the priority or relative importance of the activities/behaviors characterized by the behavior vector information structure (e.g., the severity of risk or threat that a software application or behavior poses to the proper functioning of the device, etc.) based, at least in part, on the sub-classifications. In various embodiments of this disclosure, the computing device may be configured to determine the priority or relative importance of the activities/behaviors based, at least in part, on a priority or importance value associated with each activity or behavior. The priority/importance value may be a predetermined value, a static value, or determined dynamically based, at least in part, on historical information (e.g., collected from prior executions, previous applications of behavior models, etc.), new machine learning, context modeling, etc.

In determination block 260, the processing core may determine whether the behavior vector information structure was classified as benign (or whether the activities/behaviors characterized by the behavior vector information structure are benign). In response to determining that the monitored activities characterized by the behavior vector information structure were classified as benign (i.e., determination block 260="Yes"), the processing core may continue monitoring the activities of the same or different software application in block 252 and/or perform any or all of the behavior-based operations discussed herein.

In response to determining that the monitored activities characterized by the behavior vector information structure were not classified as benign (i.e., determination block 260="No"), the processing core may determine whether the monitored activities or behavior characterized by the behavior vector information structure is included in a whitelist (e.g., the behavior white list 212 discussed above with reference to FIG. 2A) in determination block 262.

In response to determining that the activities/behavior is included in the whitelist (i.e., determination block 262="Yes"), the processing core may ignore the behavior characterized by the behavior vector information structure and continue monitoring the activities of the same or different software application in block 252 and/or perform any or all of the behavior-based operations discussed herein. That is, rather than displaying a prompt to the user or performing actuation operations in response to determining that the behavior is not benign, the processing core ignores the suspicious or potentially non-benign behavior characterized by the behavior vector information structure due to its inclusion in the whitelist. Thus, by whitelisting a behavior or monitored activity for an application, the system may no longer monitor this behavior or monitored activity for this application, thereby reducing processing by the system associated with behavior monitoring. This is especially true when it comes to a very common behavior such as location tracking.

In response to determining that the activities/behavior is not included in the whitelist (i.e., determination block 262="No"), the processing core may generate and display a prompt that requests the user to determine/select whether the software application is allowed to continue operating on the device in block 264. The prompt may also identify the reasons that the behavior was determined to be suspicious (e.g., it is adware, etc.).

In block 266, the processing core may receive a user input indicating whether the software application is allowed to continue operating on the device (e.g., that its benefits to the user outweigh its negative characteristics, etc.), and use the received user input to determine whether to add the monitored activity to the whitelist and/or whether to perform actuation operations. In block 268, the processing core may update the whitelist, such as by inserting the activities/behavior characterized by the behavior vector information structure when the user input indicates that the software application is allowed to continue operating on the device or removing the software application and/or all of the behaviors associated with that software application when the user input indicates that the software application should not continue operating on the device. Also in block 268, the processing core may perform one or more actuation operations (e.g., terminate the software application, etc.), such as when the user input indicates that the software application should not continue operating on the device.

Figure 3A:
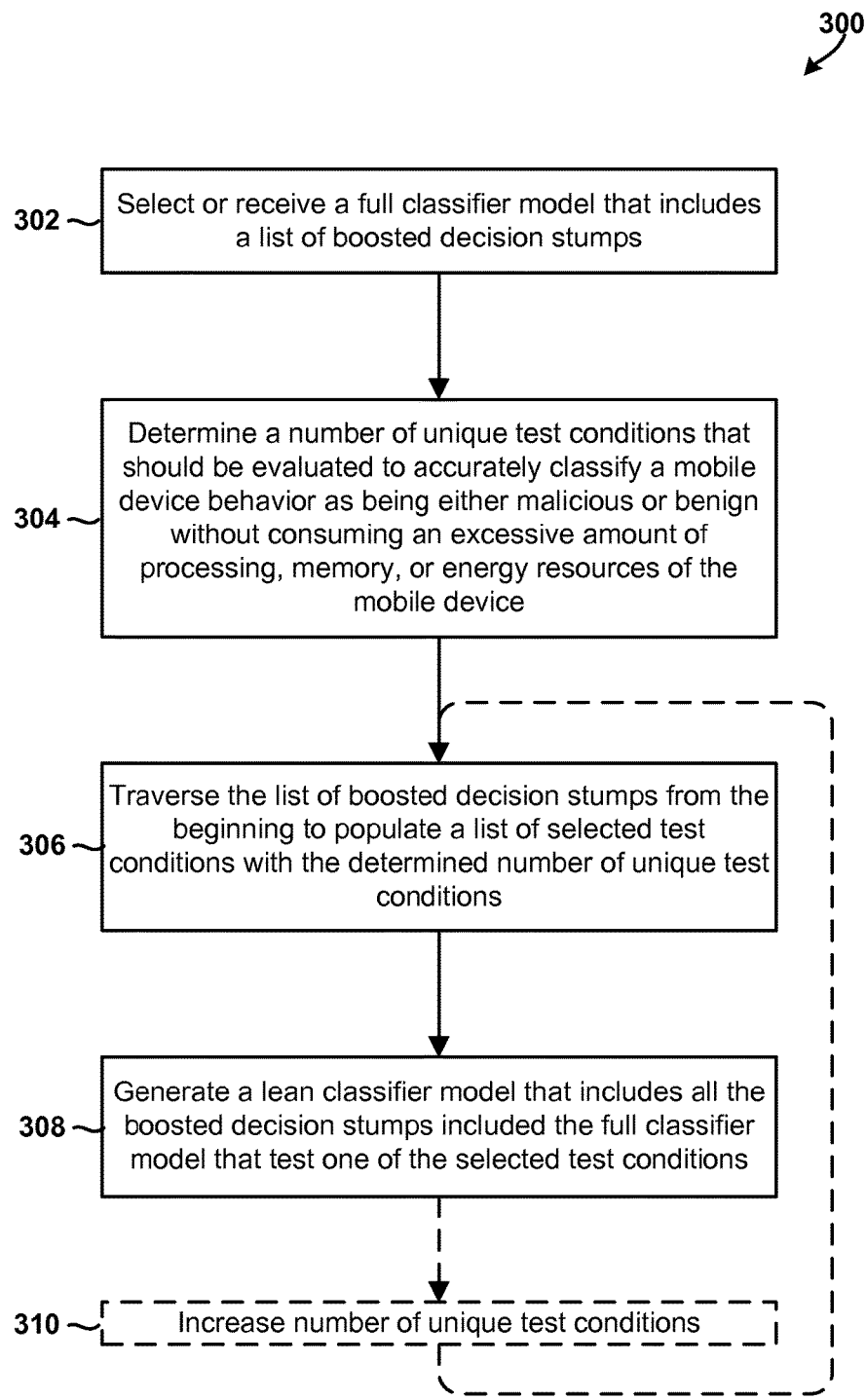
FIG. 3A is a process flow diagram illustrating a method of generating a lean classifier model that includes a subset of the features and data points included in a full classifier model in accordance with an embodiment of this disclosure.

FIG. 3A illustrates a method 300 of generating a lean or focused classifier/behavior model in the computing device. Method 300 may be performed by a processor or processing core in a resource constrained computing device, such as a mobile device. In block 302 of method 300, the processing core may select or receive a full classifier model that is or includes a finite state machine, a list of boosted decision stumps or other similar information structure. In an embodiment, the full classifier model includes a finite state machine that includes information suitable for expressing plurality of boosted decision stumps and/or which include information that is suitable for conversion by the computing device into a plurality of boosted decision stumps. In an embodiment, the finite state machine may be (or may include) an ordered or prioritized list of boosted decision stumps. Each of the boosted decision stumps may include a test condition and a weight value.

As discussed above, boosted decision stumps are one level decision trees that have exactly one node (and thus one test question or test condition) and a weight value, and thus are well suited for use in a binary classification of data/behaviors. This means that applying a feature vector or behavior vector to boosted decision stump results in binary answers (e.g., Yes or No). For example, if the question/condition tested by a boosted decision stump is "is the frequency of SMS transmissions less than x per min," applying a value of "3" to the boosted decision stump will result in either a "yes" answer (for "less than 3" SMS transmissions) or a "no" answer (for "3 or more" SMS transmissions).

Returning to FIG. 3A, in block 304 of method 300, the processing core may determine the number unique test conditions that should be evaluated to accurately classify a computing device behavior as being either benign or non-benign without consuming an excessive amount of processing, memory, or energy resources of the computing device. This may include determining an amount of processing, memory, and/or energy resources available in the computing device, the amount processing, memory, or energy resources of the computing device that are required to test a condition, determining a priority and/or a complexity associated with a behavior or condition that is to be analyzed or evaluated in the computing device by testing the condition, and selecting/determining the number of unique test conditions so as to balance between the consumption of available processing, memory, or energy resources of the computing device, the accuracy of the behavior classification that is to be achieved from testing the condition, and the importance or priority of the behavior that is tested by the condition.

In block 306, the processing core may traverse the list of boosted decision stumps from the beginning to populate a list of selected test conditions with the determined number of unique test conditions. In an embodiment, the processing core may also determine an absolute or relative priority value for each of the selected test conditions, and store the absolute or relative priorities value in association with their corresponding test conditions in the list of selected test conditions.

In block 308, the processing core may generate a lean classifier model that includes all the boosted decision stumps included in the full classifier model that test one of the selected test conditions. In an embodiment, the processing core may generate the lean classifier model to include or express the boosted decision stumps in order of importance or priority value.

In optional block 310, the number of unique test conditions may be increased in order to generate another more robust (i.e., less lean) lean classifier model by repeating the operations of traversing the list of boosted decision stumps for a larger number test conditions in block 306 and generating another lean classifier model in block 308. These operations may be repeated to generate a family of lean classifier models.

Figure 3B:
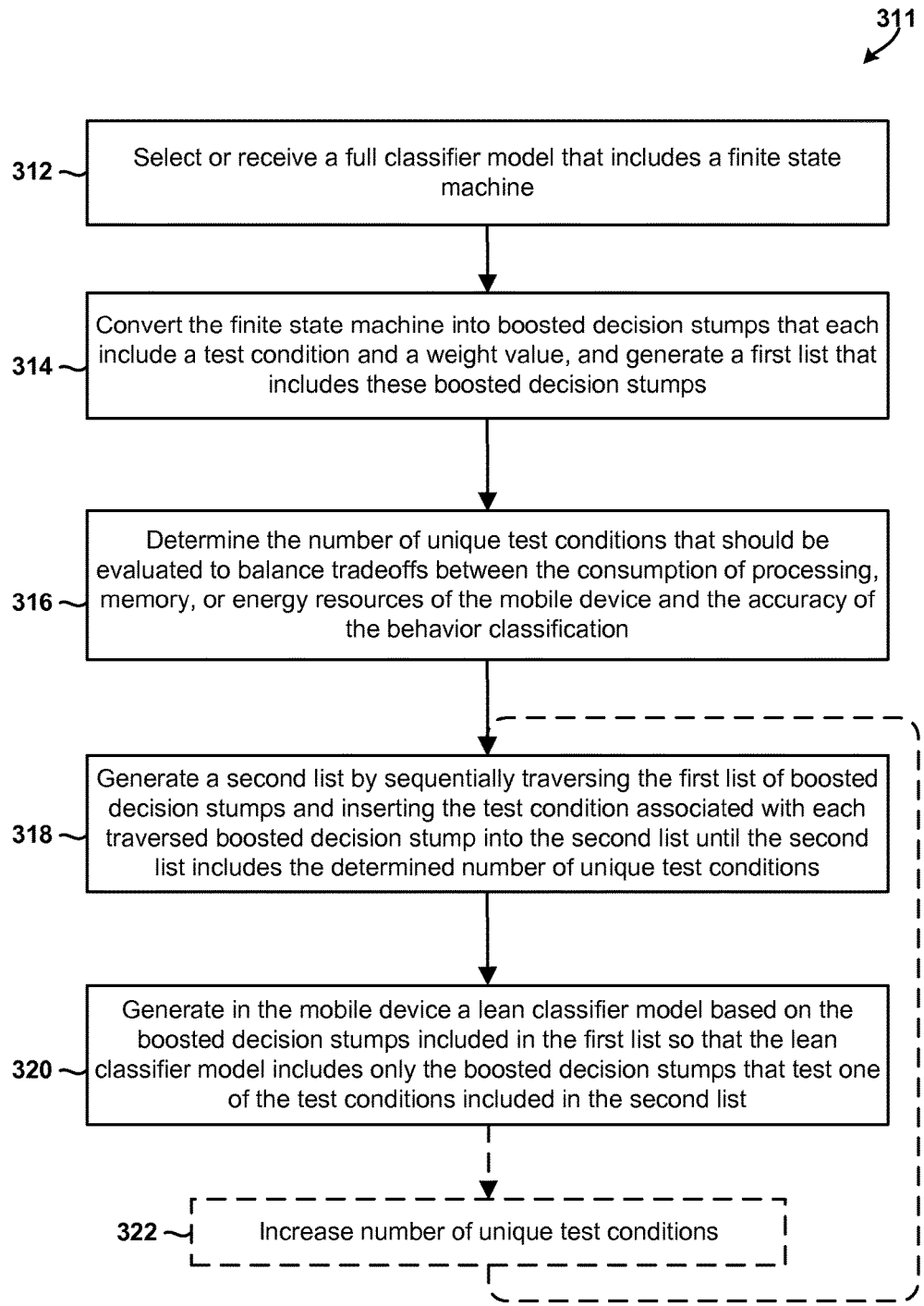
FIG. 3B is a process flow diagram illustrating another method of generating a lean classifier model locally in the computing device in accordance with another embodiment of this disclosure.

FIG. 3B illustrates another embodiment method 311 of generating data models in the computing device. Method 311 may be performed by a processing core in a computing device. In block 312 of method 311, the processing core may receive a full classifier model that includes a finite state machine. The finite state machine may be an information structure that includes information that is suitable for conversion into a plurality of boosted decision stumps. In block 314, the processing core may convert the finite state machine included in the full classifier model into boosted decision stumps that include a test condition and a weight value.

In an embodiment, the processing core may also compute or determine priority values for each of the boosted decision stumps that are generated from the finite state machine in block 312. The processing core may determine the priorities of the boosted decision stumps in a manner that balances tradeoffs between the consumption of processing, memory, or energy resources of the computing device, the accuracy of the behavior classification, etc. For example, boosted decision stumps that are quickly processed and are more energy efficient (e.g., not requiring a physical resource to be powered) may be given a higher priority, and thus more likely implemented (in block 312) in a lean classifier model than less efficient boosted decision stumps. The processing core may also determine the priorities of the boosted decision stumps based, at least in part, on their associated weight values, relative or predicted importance of the test conditions to accurately classify a behavior, etc.

Also in block 312, the processing core may generate a first list (or other information structure) that includes, references, identifies, and/or organizes the boosted decision stumps generated from the finite state machine in accordance with their priorities and/or in order of their importance. For example, the processing core may generate the first list to be an ordered list that includes the stump having the highest priority as the first item, followed by the stump having the second highest priority value, and so on. By ordering the list using priorities, the processing core may balance tradeoffs between amounts of processing, memory, or energy resources of the computing device used to monitor and analyze activities of the software application and the determined relative importance of the first monitored activity. This order of importance may also take into account the information gathered from the cloud corpus, as well as information specific to the device on which the culling algorithm is being executed.

In block 316, the processing core may compute or determine the number of unique test conditions (i.e., the computing device states, features, behaviors, or conditions that may be tested in boosted decision stumps) that should be evaluated when applying the lean classifier model. Computing or determining this number of unique test conditions may involve striking a balance or tradeoff between the consumption of processing, memory, or energy resources of the computing device required to apply the model, and the accuracy of the behavior classification that is to be achieved the lean classifier model. Such a determination may include determining an amount of processing, memory, and/or energy resources available in the computing device, determining a priority and/or a complexity associated with the behavior that is to be analyzed, and balancing the available resources with the priority and/or complexity of the behavior.

In block 318, the processing core may generate a second list by sequentially traversing the first list of boosted decision stumps and inserting the test condition values associated with each traversed boosted decision stump into the second list. The processing core may continue to traverse the first list and insert values into the second list until the length of second list is equal to the determined number of unique test conditions or until the second list includes all the determined number of unique test conditions.

In block 320, the processing core may generate a lean classifier model based, at least in part, on the boosted decision stumps included in the first list. In an embodiment, the processing core may generate the lean classifier model to include only the boosted decision stumps that test one of the test conditions included in the second list (i.e., the list of test conditions generated in block 318). Again, by using an ordered list of boosted decision stumps using priorities assigned based, at least in part, on factors such as the amount of processing, memory, or energy resources of the computing device used to monitor the feature tested by each stump, the generated lean classifier model may balance tradeoffs between amounts of processing, memory, or energy resources of the computing device used to monitor and analyze activities of the software application and the determined relative importance of the first monitored activity.

In optional block 322, the number of unique test conditions may be increased in order to generate another more robust (i.e., less lean) lean classifier model by repeating the operations of traversing the list of boosted decision stumps for a larger number test conditions in block 318 and generating another lean classifier model in block 320. These operations may be repeated to generate a family of lean classifier models.

Figure 3C:
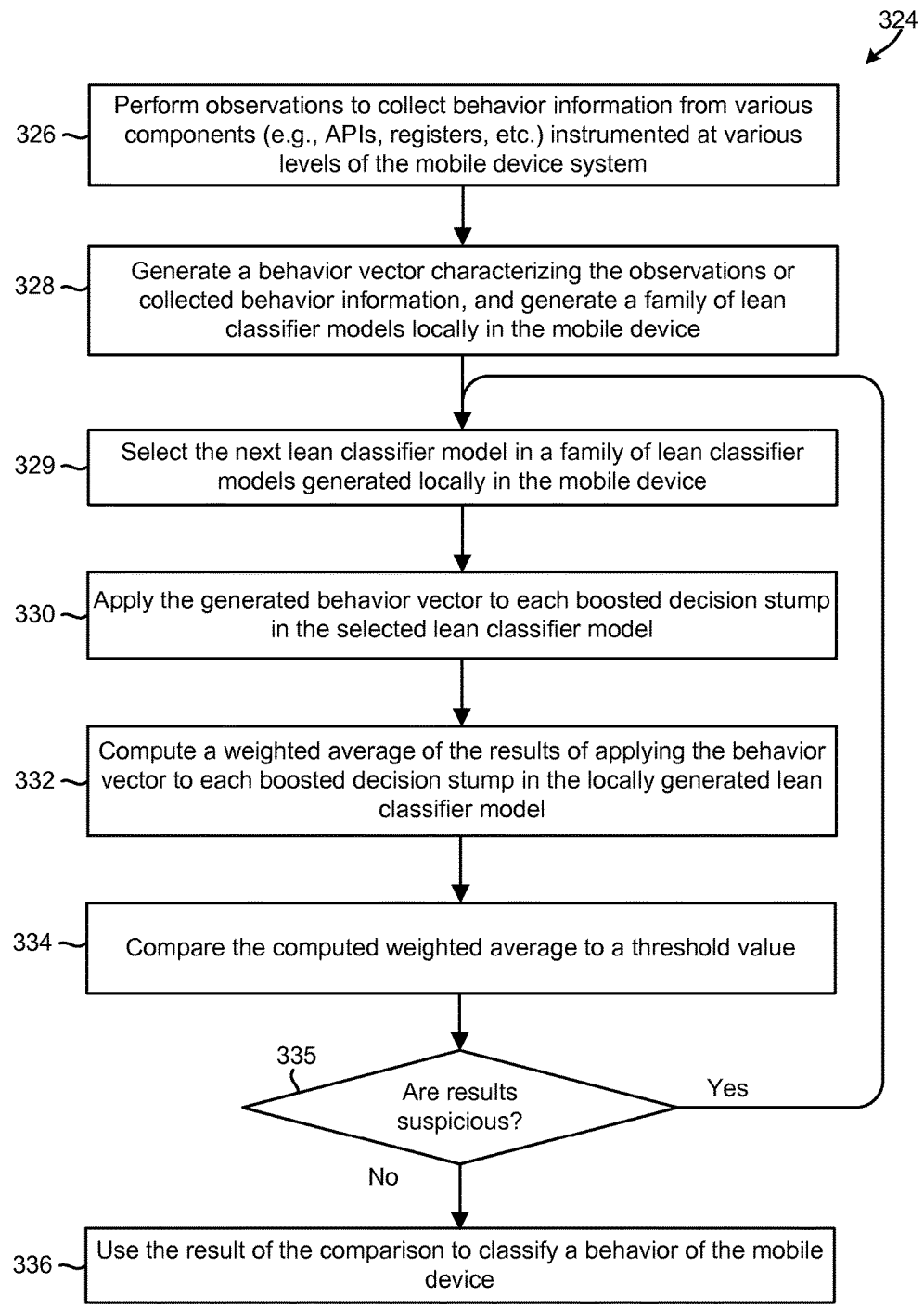
FIG. 3C is a process flow diagram illustrating a method of using a locally generated lean classifier model to classify a behavior of the computing device in accordance with an embodiment of this disclosure.

FIG. 3C illustrates an embodiment method 324 of using a lean classifier model to classify a behavior of the computing device. Method 324 may be performed by a processing core in a computing device.

In block 326 of method 324, the processing core my perform observations to collect behavior information from various components that are instrumented at various levels of the computing device system. In an embodiment, this may be accomplished via the behavior observer module 202 discussed above with reference to FIG. 2A. In block 328, the processing core may generate a behavior vector characterizing the observations, the collected behavior information, and/or a computing device behavior. Also in block 328, the processing core may use a full classifier model to generate a lean classifier model or a family of lean classifier models of varying levels of complexity (or "leanness"). To accomplish this, the processing core may cull a family of boosted decision stumps included in the full classifier model to generate lean classifier models that include a reduced number of boosted decision stumps and/or evaluate a limited number of test conditions.

In block 329, the processing core may select the leanest classifier in the family of lean classifier models (i.e., the model based, at least in part, on the fewest number of different computing device states, features, behaviors, or conditions) that has not yet been evaluated or applied by the computing device. In an embodiment, this may be accomplished by the processing core selecting the first classifier model in an ordered list of classifier models.

In block 330, the processing core may apply collected behavior information or behavior vectors to each boosted decision stump in the selected lean classifier model. Because boosted decision stumps are binary decisions and the lean classifier model is generated by selecting many binary decisions that are based, at least in part, on the same test condition, the process of applying a behavior vector to the boosted decision stumps in the lean classifier model may be performed in a parallel operation. Alternatively, the behavior vector applied in block 330 may be truncated or filtered to just include the limited number of test condition parameters included in the lean classifier model, thereby further reducing the computational effort in applying the model.

In block 332, the processing core may compute or determine a weighted average of the results of applying the collected behavior information to each boosted decision stump in the lean classifier model. In block 334, the processing core may compare the computed weighted average to a threshold value. In determination block 335, the processing core may determine whether the results of this comparison and/or the results generated by applying the selected lean classifier model are suspicious. For example, the processing core may determine whether these results may be used to classify a behavior as either benign or non-benign with a high degree of confidence, and if not treat the behavior as suspicious.

If the processing core determines that the results are suspicious (e.g., determination block 335="Yes"), the processing core may repeat the operations in blocks 329-334 to select and apply a stronger (i.e., less lean) classifier model that evaluates more device states, features, behaviors, or conditions until the behavior is classified as benign or non-benign with a high degree of confidence. If the processing core determines that the results are not suspicious (e.g., determination block 335="No"), such as by determining that the behavior can be classified as either benign or non-benign with a high degree of confidence, in block 336, the processing core may use the result of the comparison generated in block 334 to classify a behavior of the computing device as benign or potentially non-benign.

Figure 3D:
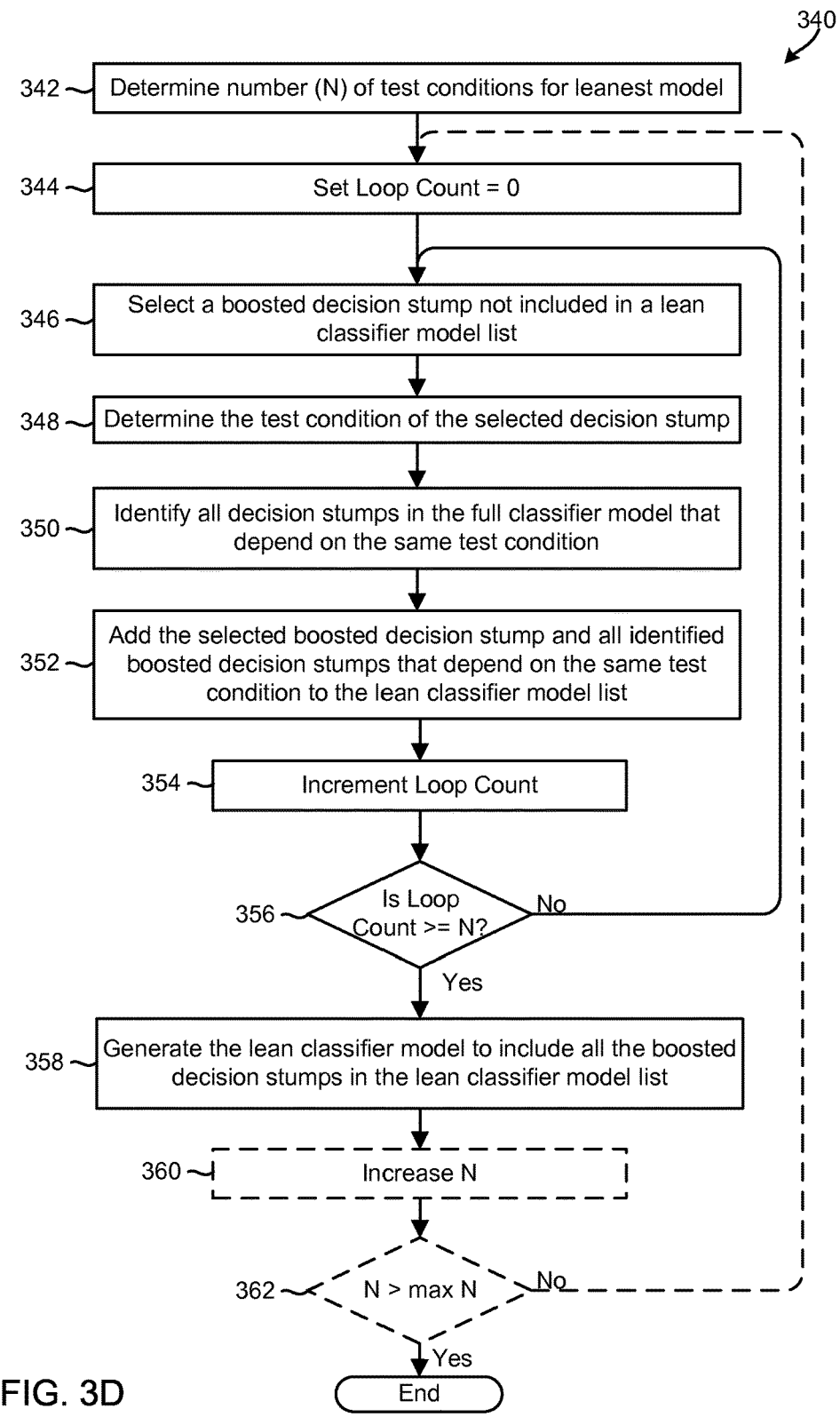
FIG. 3D is a process flow diagram illustrating yet another method of generating and using a lean classifier model in the computing device.

In an alternative embodiment method 340 illustrated in FIG. 3D the operations described above with reference to blocks 318 and 320 may be accomplished by sequentially selecting a boosted decision stump that is not already in the lean classifier model; identifying all other boosted decision stumps that depend upon the same computing device state, feature, behavior, or condition as the selected decision stump (and thus can be applied based upon one determination result); including in the lean classifier model the selected and all identified other boosted decision stumps that that depend upon the same computing device state, feature, behavior, or condition; and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

Referring to FIG. 3D, in block 342, the processing core may compute or determine a number (N) of unique test conditions (i.e., the computing device states, features, behaviors, or conditions that may be tested in boosted decision stumps) that should be evaluated in the lean classifier model. Computing or determining this number of unique test conditions may involve striking a balance or tradeoff between the consumption of processing, memory, or energy resources of the computing device required to apply the model, and the accuracy of the behavior classification that is to be achieved by the lean classifier model. Such a determination may include determining an amount of processing, memory, and/or energy resources available in the computing device, determining a priority and/or a complexity associated with the behavior that is to be analyzed, and balancing the available resources with the priority and/or complexity of the behavior.

In block 344, the processing core may set the value of a loop count variable to be equal to zero (0), or otherwise initiate a loop that will be performed the determined number N times. In block 346, the processing core may select a boosted decision stump that is included in, or generated from, the full set of boosted decision stumps and which is not included in a lean classifier model list. The first time through the loop there will be no boosted decision stumps in the lean classifier model list, so the first boosted decision stump will be selected. As mentioned herein, the full classifier model may be configured so that the first boosted decision stump in the full set has the highest probability of recognizing benign or non-benign behavior. In block 348, the processing core may determine the test condition associated with the selected decision stump. In block 350, the processing core may identify all of the decision stumps included in, or generated from, the full classifier model that depend on, include, or test the same test condition as the test condition of the selected decision stump. In block 352, the processing core may add the selected boosted decision stump and all of the identified boosted decision stumps that depend on, include, or test the same test condition to the lean classifier model list.

In block 354, the processing core may increment the value of the loop count variable. In determination block 356, the processing core may determine whether the value of the loop count variable is greater than or equal to the number N of unique test conditions determined in block 342. When the processing core determines that the value of the loop count variable is not greater than or equal to the number of unique test conditions (i.e., determination block 356="No"), the processing core may repeat the operations in blocks 346-354. When the processing core determines that the value of the loop count variable is greater than or equal to the number of unique test conditions (i.e., determination block 356="Yes"), in block 358, the processing core may generate the lean classifier model to include all the boosted decision stumps in the lean classifier model list.

This method 340 may be used a number of times to generate a family of lean classifier models of varying degrees of robustness or leanness by varying the number N of unique test conditions in the lean classifier model. For example, in optional block 360, the computing device processor may increase the number N of unique test conditions determined in block 342 in order to generate another lean classifier model that incorporates more test conditions. In optional determination block 362, the processor may determine whether the increase number N exceeds a maximum number (max N) of test conditions. The maximum number of test conditions may be determined (e.g., by a developer, service provider, user or via an algorithm) based, at least in part, on a maximum performance penalty or resource investment desired for assessing difficult-to-classify behaviors. If the increased number N is less than the maximum number max N (i.e., determination block 362="No"), the operations of blocks 344 through 360 described above may be repeated to generate another lean classifier model. Once the maximum number of unique test conditions have been included in a lean classifier model (i.e., determination block 362="Yes"), the process of generating lean classifier models may end.

While FIGS. 3A, 3B and 3D describe generating a family of lean classifier models by repeating the entire process of traversing the full set of boosted decision stumps, a similar result may be achieved by beginning with a generated lean classifier model (i.e., a model generated in any of blocks 308, 320 and 358) and traversing the full set of boosted decision stumps for the added number of test conditions adding to that model boosted decision stumps depending on a test condition not already included in the generated lean classifier model.

Also, while FIGS. 3A, 3B and 3D describe generating a family of lean classifier models from leanest to most robust, the lean classifier models may also be generated from most robust to leanest simply by beginning with a maximum number of test conditions (e.g., N=max N) and decreasing the number each time.

Figure 4A:
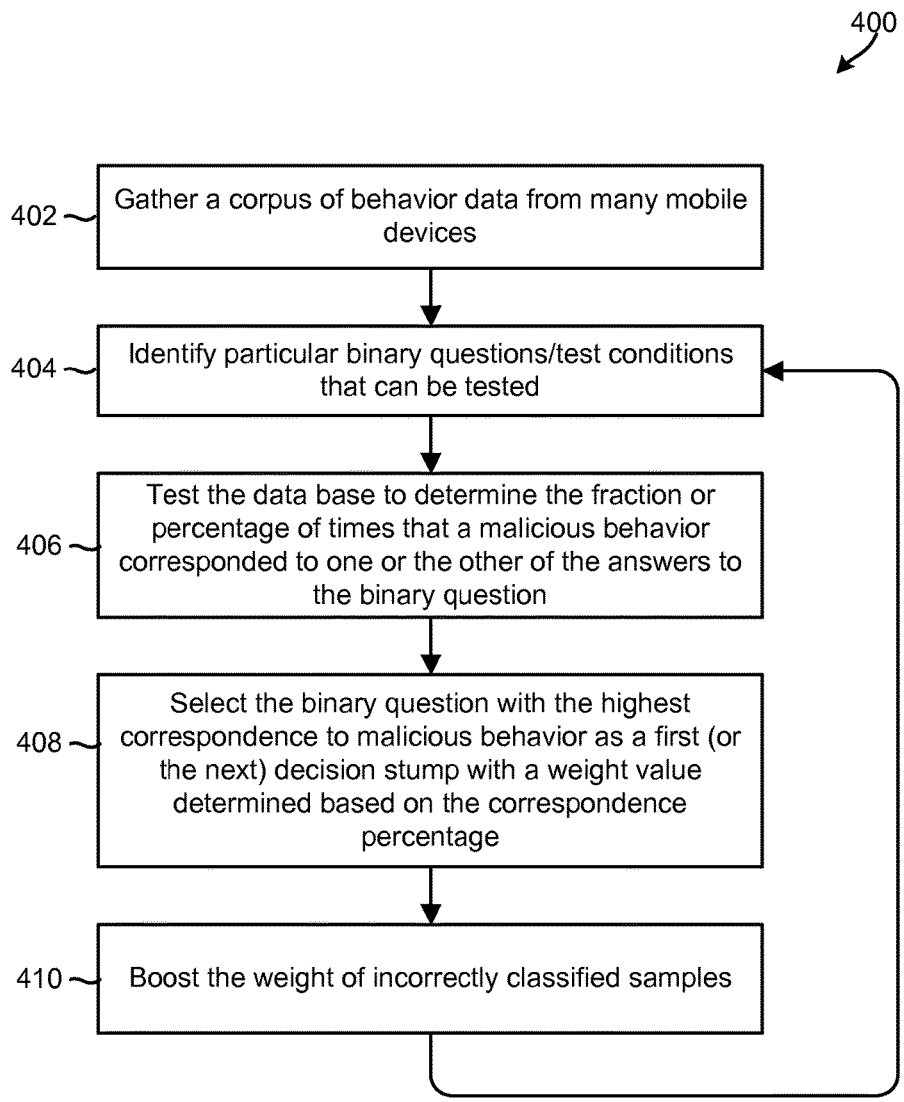
FIG. 4A is a process flow diagram illustrating a method of generating a full classifier model that includes boosted decision stumps that are suitable for use by a computing device in generating more focused and lean classifier models.

FIG. 4A illustrates an embodiment method 400 of generating a full classifier model. Method 400 may be performed by a processor or processing core in resource constrained computing device, such as a mobile device.

In block 402, the processing core may receive or gather a corpus of behavior data (e.g., from many computing devices), including a large number of device states, configurations and behavior, as well as information regarding whether a malicious behavior was detected. In block 404, the processing core may identify particular binary questions/test conditions that can be tested within the device states, configurations and behavior from the corpus of behavior data. To characterize all of the device states, configurations and behaviors, a large number of such binary questions/test conditions will typically be identified. Then, in block 406, for each identified binary question, the processing core may test the data base to determine the fraction or percentage of times that a malicious behavior corresponded to one or the other of the answers to the binary question. In block 408, the processing core may select the binary question with the highest correspondence to non-benign behavior as a first decision stump with a weight value determined based, at least in part, on the correspondence percentage. In block 410, the processing core may boost the weight of the incorrectly classified samples/test conditions as described below with reference to FIG. 4B.

The processing core may then repeat the process of scanning the binary question assuming the answer of the first question is the value (e.g., "no") not associated with malicious behavior to identify the question with the highest correspondence to malicious behavior in this case. That question is then set as the second binary question in the model, with its weight value determined based, at least in part, on its correspondence percentage. The processing core may then repeat the process of scanning the binary question—assuming the answers of the first and questions/test conditions are the values (e.g., "no") not associated with malicious behavior—to identify the next question/test condition with the highest correspondence to malicious behavior in this case. That question/test condition is then the third binary question/test condition in the model, with its weight value determined based, at least in part, on its correspondence percentage. This process is continued through all of the identified binary questions/test conditions to build the complete set.

In the process of generating the binary questions/test conditions, processing core may evaluate data that has a range, such as the frequency of communications, or the number of communications within a previous time interval, and formulate a series of binary questions/test conditions that encompass the range in a manner that helps classify behaviors. Thus, one binary question/test condition might be whether the device has sent more than zero data transmissions within the previous five minutes (which might have a low correlation), a second binary question/test condition might be whether the device has sent more than 10 data transmissions in the previous five minutes (which might have a medium correlation), and a third question/test condition might be whether the device has sent more than 100 data transmissions within the previous five minutes (which might have a high correlation).

Some culling of the final set of questions/test conditions may be done by the processing core to remove those questions/test conditions whose determined weight or correlation to malicious behavior is less than a threshold value (e.g., less than statistically significant). For example, if the correlation to malicious behavior is approximately 50/50, there may be little benefit in using that decision stump as neither answer nor helps answer the question of whether current behavior is benign or non-benign.

Figure 4B:
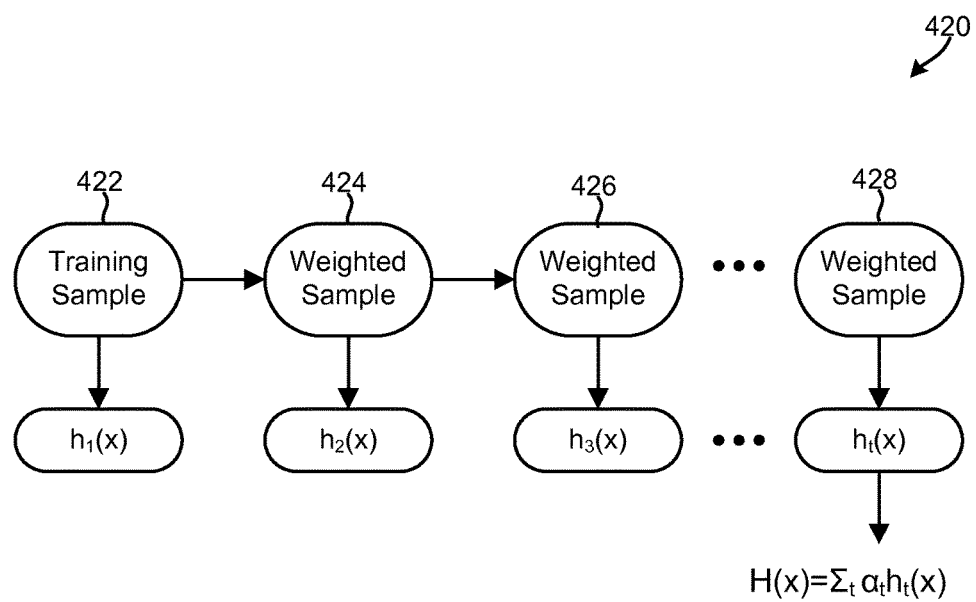
FIG. 4B is a process flow diagram illustrating an example method suitable for generating a boosted decision stump classifier in accordance with various embodiments of this disclosure.

FIG. 4B illustrates an example boosting method 420 suitable for generating a boosted decision tree/classifier that is suitable for use in accordance with various embodiments. In operation 422, a processor or processing core may generate and/or execute a decision tree/classifier, collect a training sample from the execution of the decision tree/classifier, and generate a new classifier model (h1($x$)) based, at least in part, on the training sample. The training sample may include information collected from previous observations or analysis of device behaviors, software applications, or processes in that device. The training sample and/or new classifier model (h1($x$)) may be generated based, at least in part, on the types of question or test conditions included in previous classifiers and/or based, at least in part, on accuracy or performance characteristics collected from the execution/application of previous data/behavior models or classifier models of a behavior analyzer module 204. In operation 424, the processor or processing core may boost (or increase) the weight of the entries that were misclassified by the generated decision tree/classifier (h1(x)) to generate a second new tree/classifier (h2(x)). In an embodiment, the training sample and/or new classifier model (h2(x)) may be generated based, at least in part, on the error/mistake rate of a previous execution or use (h1(x)) of a classifier. In an embodiment, the training sample and/or new classifier model (h2(x)) may be generated based, at least in part, on attributes determined to have that contributed to the mistake rate or the misclassification of data points in the previous execution or use of a classifier.

In an embodiment, the misclassified entries may be weighted based, at least in part, on their relatively accuracy or effectiveness. In operation 426, the processor or processing core may boost (or increase) the weight of the entries that were misclassified by the generated second tree/classifier (h2(x)) to generate a third new tree/classifier (h3(x)). In operation 428, the operations of 424-426 may be repeated to generate "t" number of new tree/classifiers ($h_t(x)$).

By boosting or increasing the weight of the entries that were misclassified by the first decision tree/classifier (h1(x)), the second tree/classifier (h2(x)) may more accurately classify the entities that were misclassified by the first decision tree/classifier (h1(x)), but may also misclassify some of the entities that where correctly classified by the first decision tree/classifier (h1(x)). Similarly, the third tree/classifier (h3(x)) may more accurately classify the entities that were misclassified by the second decision tree/classifier (h2(x)) and misclassify some of the entities that where correctly classified by the second decision tree/classifier (h2(x)). That is, generating the family of tree/classifiers h1(x)-$h_t$(x) may not result in a system that converges as a whole, but results in a number of decision trees/classifiers that may be executed in parallel.

Figure 5:
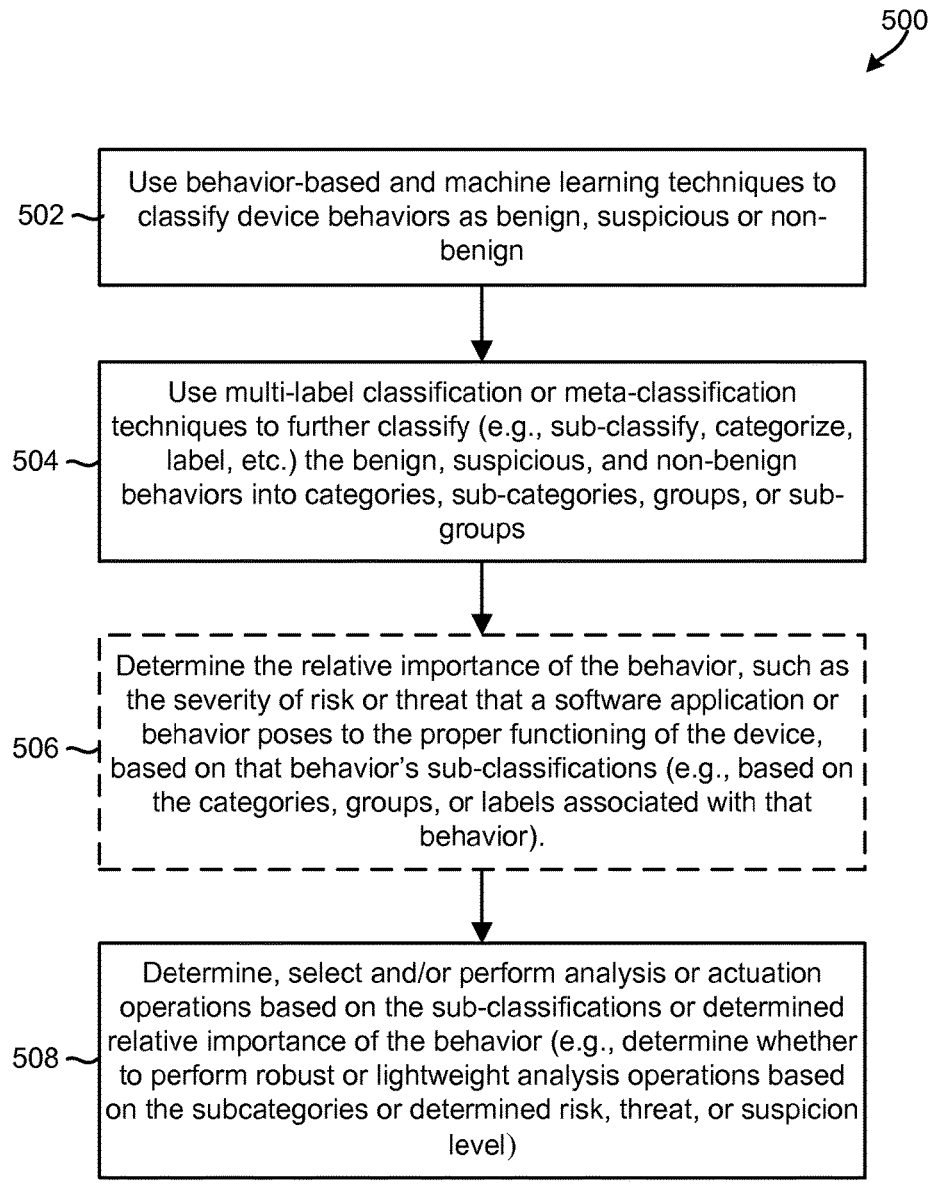
FIG. 5 is a process flow diagram illustrating a method for classifying and sub-classifying behaviors in accordance with an embodiment of this disclosure.

FIG. 5 illustrates a method 500 of classifying and sub-classifying a behavior in accordance with an embodiment. Method 500 may be performed by a processor or processing core in a mobile or resource constrained computing device. In block 502, the processing core may use behavior-based and machine learning techniques to classify device behaviors as benign, suspicious or non-benign. In block 504, the processing core may use multi-label classification or meta-classification techniques to further classify (e.g., sub-classify, categorize, label, etc.) the benign, suspicious, and non-benign behaviors into categories, sub-categories, groups, or sub-groups.

In optional block 506, the processing core may determine the relative importance of the behavior, such as the severity of risk or threat that a software application or behavior poses to the proper functioning of the device, based, at least in part, on that behavior's sub-classifications (e.g., based, at least in part, on the categories, groups, or labels associated with that behavior).

In block 508, the processing core may determine, select and/or perform analysis or actuation operations based, at least in part, on the sub-classifications or determined relative importance of the behavior (e.g., determine whether to perform robust or lightweight analysis operations based, at least in part, on the categories, groups, or labels associated with a behavior).

Figure 6:
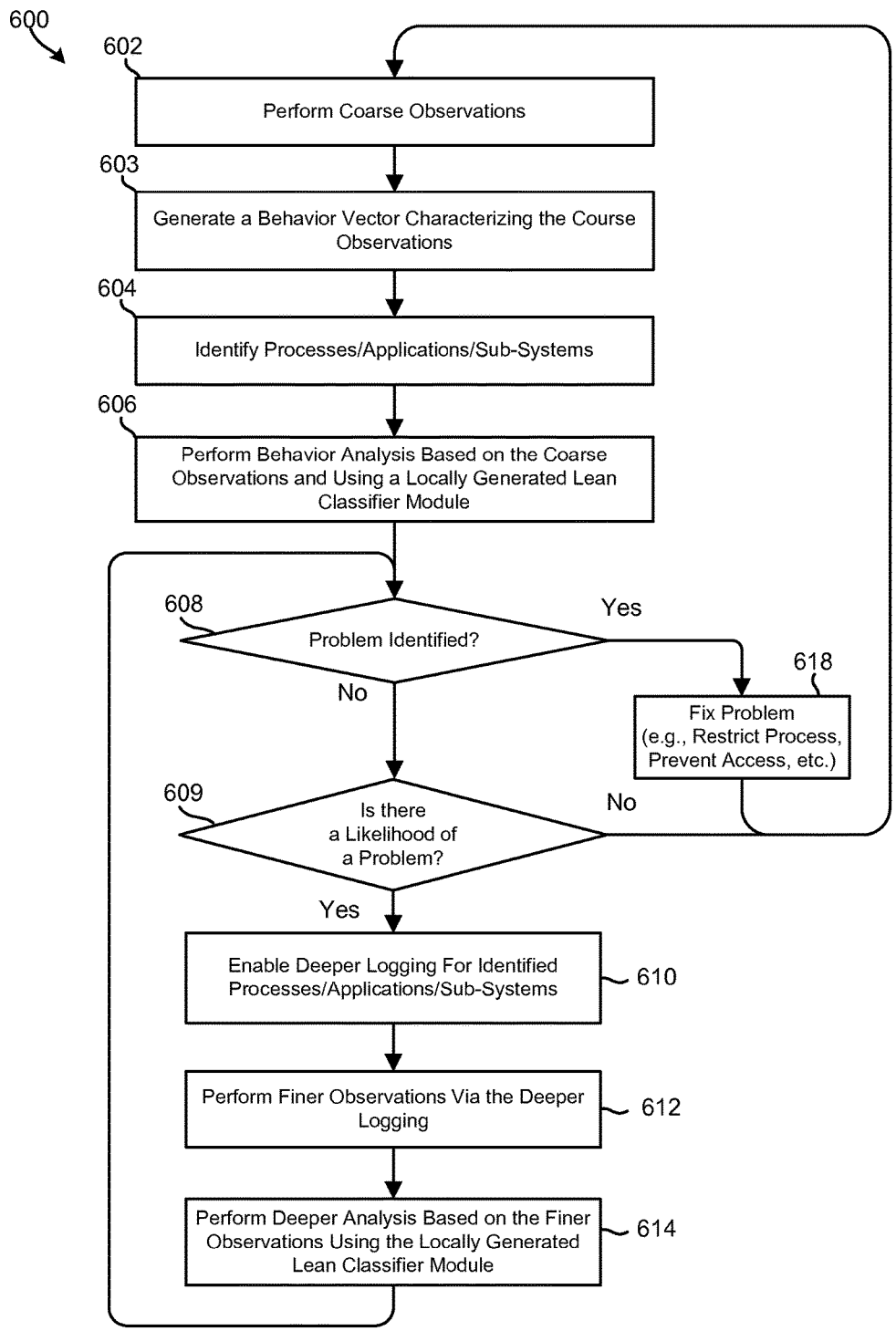
FIG. 6 is a process flow diagram illustrating a method for performing adaptive observations in accordance with an embodiment of this disclosure.

FIG. 6 illustrates an example method 600 for performing dynamic and adaptive observations in accordance with an embodiment. In block 602, a device processor may perform coarse observations by monitoring/observing a subset of a large number of factors/behaviors that could contribute to the mobile device's degradation. In block 603, the device processor may generate a behavior vector characterizing the coarse observations and/or the mobile device behavior based, at least in part, on the coarse observations.

In block 604, the device processor may identify subsystems, processes, and/or applications associated with the coarse observations that may potentially contribute to the mobile device's degradation. This may be achieved, for example, by comparing information received from multiple sources with contextual information received from sensors of the mobile device. In block 606, the device processor may perform behavioral analysis operations based, at least in part, on the coarse observations. In an embodiment, as part of blocks 603 and 604, the device processor may perform one or more of the operations discussed above with reference to FIGS. 2-10.

In determination block 608, the device processor may determine whether suspicious behaviors or potential problems can be identified and corrected based, at least in part, on the results of the behavioral analysis. When the device processor determines that the suspicious behaviors or potential problems can be identified and corrected based, at least in part, on the results of the behavioral analysis (i.e., determination block 608="Yes"), the processor may initiate a process to correct the behavior in block 618, and perform additional coarse observations in block 602.

When the device processor determines that the suspicious behaviors or potential problems cannot be identified and/or corrected based, at least in part, on the results of the behavioral analysis (i.e., determination block 608="No"), the device processor may determine whether there is a likelihood of a problem in determination block 609. In an embodiment, the device processor may determine that there is a likelihood of a problem by computing a probability of the mobile device encountering potential problems and/or engaging in suspicious behaviors, and determining whether the computed probability is greater than a predetermined threshold.

When the device processor determines that the computed probability is not greater than the predetermined threshold and/or there is not a likelihood that suspicious behaviors or potential problems exist and/or are detectable (i.e., determination block 609="No"), the processor may perform additional coarse observations in block 612.

When the device processor determines that there is a likelihood that suspicious behaviors or potential problems exist and/or are detectable (i.e., determination block 609="Yes"), the device processor may perform deeper logging/observations or final logging on the identified subsystems, processes or applications in block 610. In block 612, the device processor may perform deeper and more detailed observations on the identified subsystems, processes or applications. In block 614, the device processor may perform further and/or deeper behavioral analysis based, at least in part, on the deeper and more detailed observations. In determination block 608, the device processor may again determine whether the suspicious behaviors or potential problems can be identified and corrected based, at least in part, on the results of the deeper behavioral analysis.

When the device processor determines that the suspicious behaviors or potential problems cannot be identified and corrected based, at least in part, on the results of the deeper behavioral analysis (i.e., determination block 608="No"), the processor may repeat the operations in blocks 610-614 until the level of detail is fine enough to identify the problem or until it is determined that the problem cannot be identified with additional detail or that no problem exists.

When the device processor determines that the suspicious behaviors or potential problems can be identified and corrected based, at least in part, on the results of the deeper behavioral analysis (i.e., determination block 608="Yes"), the device processor may perform operations to correct the problem/behavior in block 618, and the processor may perform additional operations in block 602

In an embodiment, as part of blocks 602-618 of the method 600, the device processor may perform real-time behavior analysis of the system's behaviors to identify suspicious behaviors from limited and coarse observations, to dynamically determine the behaviors to observe in greater detail, and to dynamically determine the precise level of detail required for the observations. This enables the device processor to efficiently identify and prevent problems from occurring, without requiring the use of a large amount of processor, memory, or battery resources on the device.

Figure 7:
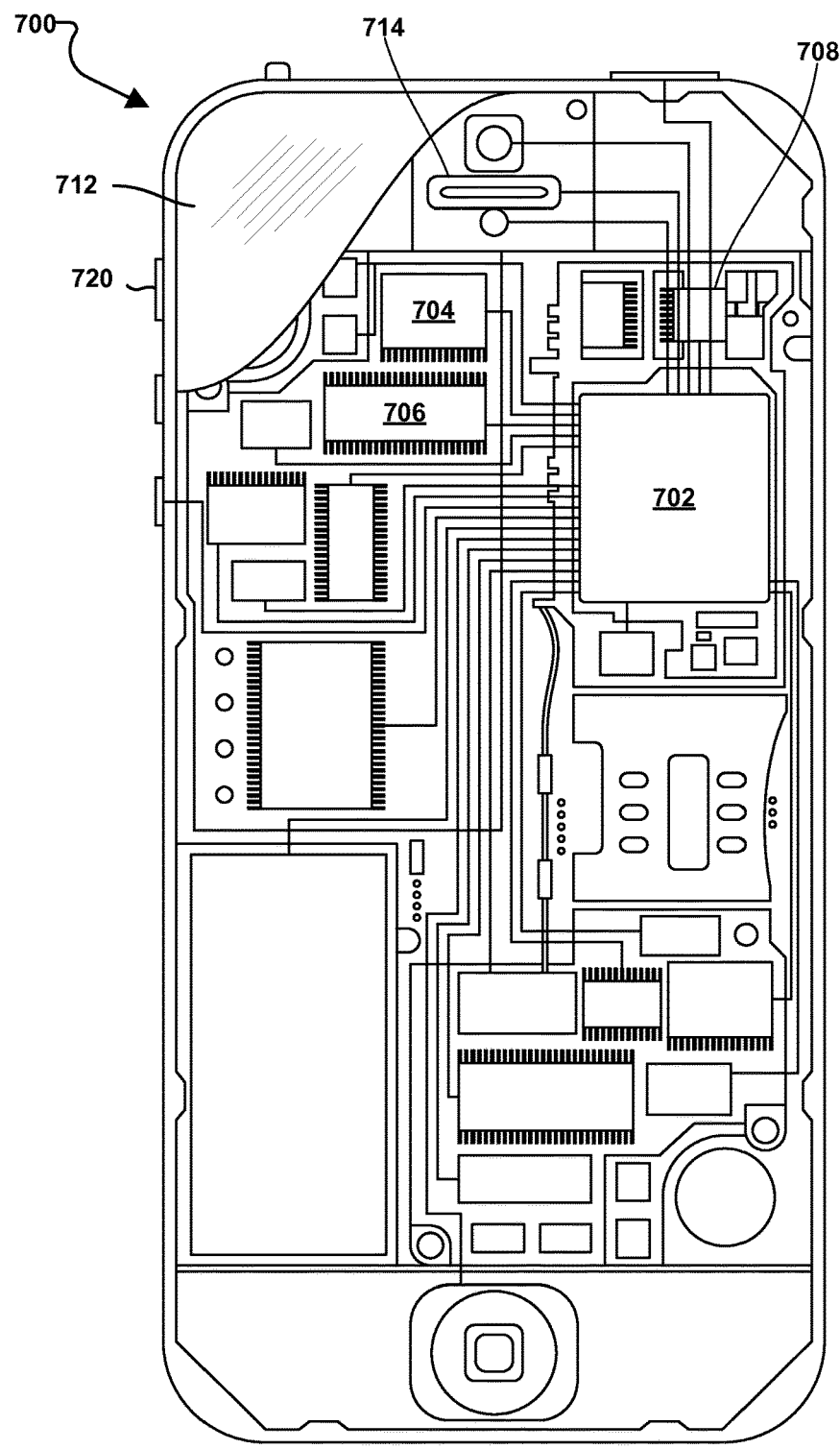
FIG. 7 is a component block diagram of a mobile device suitable for use in an embodiment of this disclosure.

The various embodiments may be implemented on a variety of computing devices, an example of which is illustrated in FIG. 7 in the form of a smartphone. A smartphone 700 may include a processor 702 coupled to internal memory 704, a display 712, and to a speaker 714. Additionally, the smartphone 700 may include an antenna for sending and receiving electromagnetic radiation that may be connected to a wireless data link and/or cellular telephone transceiver 708 coupled to the processor 702. Smartphones 700 typically also include menu selection buttons or rocker switches 720 for receiving user inputs.

A typical smartphone 700 also includes a sound encoding/decoding (CODEC) circuit 706, which digitizes sound received from a microphone into data packets suitable for wireless transmission and decodes received sound data packets to generate analog signals that are provided to the speaker to generate sound. Also, one or more of the processor 702, wireless transceiver 708 and CODEC 706 may include a digital signal processor (DSP) circuit (not shown separately).

The processors 702 may be any programmable microprocessor, microcomputer or multiple processor chip or chips that can be configured by software instructions (applications) to perform a variety of functions, including the functions of the various embodiments described below. In some mobile devices, multiple processors 702 may be provided, such as one processor dedicated to wireless communication functions and one processor dedicated to running other applications. Typically, software applications may be stored in the internal memory 704 before they are accessed and loaded into the processor 702. The processor 702 may include internal memory sufficient to store the application software instructions.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "performance degradation" is used in this application to refer to a wide variety of undesirable computing device operations and characteristics, such as longer processing times, slower real time responsiveness, lower battery life, loss of private data, malicious economic activity (e.g., sending unauthorized premium SMS message), denial of service (DoS), operations relating to commandeering the computing device or utilizing the phone for spying or botnet activities, etc.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of evaluating device behaviors in a computing device, comprising:
   monitoring activities of a software application operating on the computing device;
   generating a behavior vector information structure that characterizes a first monitored activity of the software application;
   applying the behavior vector information structure to a machine learning classifier model to generate analysis results;
   using the analysis results to classify the first monitored activity as one of benign, suspicious, and non-benign;
   displaying a prompt that requests that a user select whether to whitelist the first monitored activity of the software application in response to classifying the first monitored activity as suspicious or non-benign;
   adding the first monitored activity of the software application to a whitelist in response to receiving a user input; and
   cease monitoring the first monitored activity of the software application in response to including the first monitored activity of the software application in the whitelist.

2. The method of claim 1, wherein the behavior vector information structure and the classification of the first monitored activity are stored in association with the software application.

3. The method of claim 1, further comprising using multi-label classification or meta-classification techniques to further classify the first monitored activity into one or more sub-categories, wherein the prompt that requests that the user select whether to whitelist the first monitored activity of the software application includes the one or more sub-categories associated with the first monitored activity.

4. The method of claim 3, further comprising:
   continuing monitoring activities of the software application, generating a second behavior vector information structure, applying the second behavior vector information structure to a second machine learning classifier model to generate an additional analysis result, and using the additional analysis result to classify a second monitored activity into a sub-category;
   determining whether the second monitored activity is classified into the same sub-category as the first monitored activity; and displaying an additional prompt that requests that the user select whether to whitelist the second monitored activity of the software application in response to determining that the second monitored activity is not classified into the same sub-category as the first monitored activity.

5. The method of claim 4, further comprising:
removing the first monitored activity from the whitelist and terminating the software application in response to receiving an additional user input selecting not to whitelist the second monitored activity.

6. The method of claim 4, further comprising:
adding the second monitored activity to the whitelist in response to receiving an additional user input selecting to whitelist the second monitored activity.

7. The method of claim 1, further comprising ceasing monitoring the first monitored activity for the software application in response to receiving the user input.

8. The method of claim 1, further comprising determining a relative importance of the first monitored activity characterized by the behavior vector information structure, wherein the prompt that requests that the user select whether to whitelist the first monitored activity of the software application includes information that identifies the relative importance of the first monitored activity.

9. The method of claim 8, further comprising balancing tradeoffs between amounts of processing, memory, or energy resources of the computing device used to monitor and analyze activities of the software application and the determined relative importance of the first monitored activity.

10. The method of claim 9, wherein the balancing comprises selecting actuation operations based, at least in part, on the determined relative importance of the first monitored activity.

11. The method of claim 10, wherein selecting actuation operations comprises determining whether to perform robust analysis operations or lightweight analysis operations based, at least in part, on sub-classifications of the first monitored activity.

12. A computing device, comprising:
a memory;
a display; and
a processor coupled to the memory and the display, and configured with processor-executable instructions to:
monitor activities of a software application operating on the computing device;
generate a behavior vector information structure that characterizes a first monitored activity of the software application;
apply the behavior vector information structure to a machine learning classifier model to generate analysis results;
use the analysis results to classify the first monitored activity of the software application as one of benign, suspicious, and non-benign;
display a prompt that requests that a user select whether to whitelist the first monitored activity of the software application in response to classifying the first monitored activity as suspicious or non-benign;
add the first monitored activity of the software application to a whitelist in response to receiving a user input; and
cease monitoring the first monitored activity of the software application in response to including the first monitored activity of the software application in the whitelist.

13. The computing device of claim 12, wherein the processor is further configured with processor-executable instructions to store the behavior vector information structure and the classification of the first monitored activity in association with the software application.

14. The computing device of claim 12, wherein the processor is further configured with processor-executable instructions to use multi-label classification or meta-classification techniques to further classify the first monitored activity into one or more sub-categories,
wherein the processor is further configured with processor-executable instructions to prompt the user to select whether to whitelist the first monitored activity of the software application includes the one or more sub-categories associated with the first monitored activity.

15. The computing device of claim 14, wherein the processor is further configured with processor-executable instructions to:
continue monitoring activities of the software application, generating a second behavior vector information structure, applying the second behavior vector information structure to a second machine learning classifier model to generate additional analysis results, and using the additional analysis results to classify a second monitored activity into a sub-category;
determine whether the second monitored activity is sub classified into the same sub-category as the first monitored activity; and
display an additional prompt that requests that the user select whether to whitelist the second monitored activity of the software application in response to determining that the second monitored activity is not classified into the same sub-category as the first monitored activity.

16. The computing device of claim 15, wherein the processor is further configured with processor-executable instructions to:
remove the first monitored activity from the whitelist and terminating the software application in response to receiving an additional user input selecting not to whitelist the second monitored activity.

17. The computing device of claim 15, wherein the processor is further configured with processor-executable instructions to:
add the second monitored activity to the whitelist in response to receiving an additional user input selecting to whitelist the second monitored activity.

18. The computing device of claim 12, wherein the processor is further configured with processor-executable instructions to no longer monitor the first monitored activity of the software application in response to receiving the user input selecting to whitelist the first monitored activity.

19. The computing device of claim 12, wherein the processor is further configured with processor-executable instructions to determine a relative importance of the first monitored activity characterized by the behavior vector information structure, wherein the prompt that includes the one or more sub-categories associated with the first monitored activity and requests that the user select whether to whitelist the first monitored activity of the software application includes information that identifies the relative importance of the first monitored activity.

20. The computing device of claim 19, wherein the processor is further configured with processor-executable instructions to balance tradeoffs between amounts of processing, memory, or energy resources of the computing device used to monitor and analyze activities of the software application and the determined relative importance of the first monitored activity.

21. The computing device of claim 20, wherein the processor is further configured with processor-executable instructions to balance tradeoffs between amounts of processing, memory, or energy resources of the computing device used to monitor and analyze activities of the software application and the determined relative importance of the first monitored activity by selecting actuation operations based, at least in part, on the determined relative importance of the first monitored activity.

22. The computing device of claim 21, wherein the processor is further configured with processor-executable instructions to select actuation operations based, at least in part, on the determined relative importance of the first monitored activity by determining whether to perform robust or lightweight analysis operations based, at least in part, on the one or more sub-categories associated with the first monitored activity.

23. A non-transitory processor-readable storage medium having stored thereon processor-executable instructions configured to cause a processor of a computing device to perform operations comprising:
monitoring activities of a software application operating on the computing device;
generating a behavior vector information structure that characterizes a first monitored activity of the software application;
applying the behavior vector information structure to a machine learning classifier model to generate analysis results;
using the analysis results to classify the first monitored activity of the software application as one of benign, suspicious, and non-benign;
displaying a prompt that requests that a user select whether to whitelist the first monitored activity of the software application in response to classifying the first monitored activity as suspicious or non-benign;
adding the first monitored activity of the software application to a whitelist in response to receiving a user input; and
cease monitoring the first monitored activity of the software application in response to including the first monitored activity of the software application in the whitelist.

24. The non-transitory processor-readable storage medium of claim 23, wherein the stored processor-executable instructions are configured to cause the processor of the computing device to perform operations such that the behavior vector information structure and the classification of the first monitored activity are stored in association with the software application.

25. The non-transitory processor-readable storage medium of claim 23, wherein the stored processor-executable instructions are configured to cause the processor of the computing device to perform operations further comprising using multi-label classification or meta-classification techniques to further classify the first monitored activity into one or more sub-categories,
wherein the stored processor-executable instructions are configured to cause the processor of the computing device to perform operations such that the prompt that requests that the user select whether to whitelist the first monitored activity of the software application includes the one or more sub-categories associated with the first monitored activity.

26. The non-transitory processor-readable storage medium of claim 25, wherein the stored processor-executable instructions are configured to cause the processor of the computing device to perform operations further comprising:
continuing monitoring activities of the software application, generating a second behavior vector information structure, applying the second behavior vector information structure to a second machine learning classifier model to generate additional analysis results, and using the additional analysis results to classify a second monitored activity into a sub-category;
determining whether the second monitored activity is classified into the same sub-category as the first monitored activity; and
displaying an additional prompt that requests that the user select whether to whitelist the second monitored activity of the software application in response to determining that the second monitored activity is not classified into the same sub-category as the first monitored activity.

27. The non-transitory processor-readable storage medium of claim 26, wherein the stored processor-executable instructions are configured to cause the processor of the computing device to perform operations further comprising:
removing the first monitored activity from the whitelist and terminating the software application in response to receiving an additional user input selecting not to whitelist the second monitored activity.

28. The non-transitory processor-readable storage medium of claim 26, wherein the stored processor-executable instructions are configured to cause the processor of the computing device to perform operations further comprising:
adding the second monitored activity to the whitelist in response to receiving an additional user input selecting to whitelist the second monitored activity.

29. The non-transitory processor-readable storage medium of claim 23, wherein the stored processor-executable instructions are configured to cause the processor of the computing device to perform operations further comprising no longer monitoring the first monitored activity of the software application in response to receiving the user input.

30. A computing device, comprising:
means for monitoring activities of a software application operating on the computing device;
means for generating a behavior vector information structure that characterizes a first monitored activity of the software application;
means for applying the behavior vector information structure to a machine learning classifier model to generate analysis results;
means for using the analysis results to classify the first monitored activity of the software application as one of benign, suspicious, and non-benign;
means for displaying a prompt that requests that a user select whether to whitelist the first monitored activity of the software application in response to classifying the first monitored activity as suspicious or non-benign;
means for adding the first monitored activity of the software application to a whitelist in response to receiving a user input; and
means for ceasing the monitoring of the first monitored activity of the software application in response to including the first monitored activity of the software application in the whitelist.

* * * * *